US012567692B2

(12) United States Patent
Kanematsu et al.

(10) Patent No.: US 12,567,692 B2
(45) Date of Patent: Mar. 3, 2026

(54) CONNECTOR WITH CONTACT PRESSURE APPLYING COMPONENT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Junichi Mukuno, Mie (JP); Sunghyun Byun, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 281 days.

(21) Appl. No.: 18/281,926

(22) PCT Filed: Mar. 8, 2022

(86) PCT No.: PCT/JP2022/009875

§ 371 (c)(1),
(2) Date: Sep. 13, 2023

(87) PCT Pub. No.: WO2022/196424

PCT Pub. Date: Sep. 22, 2022

(65) Prior Publication Data

US 2024/0313457 A1 Sep. 19, 2024

(30) Foreign Application Priority Data

Mar. 17, 2021 (JP) ................................ 2021-043146

(51) Int. Cl.
*H01R 13/193* (2006.01)

(52) U.S. Cl.
CPC .................................. *H01R 13/193* (2013.01)

(58) Field of Classification Search
CPC .............................. H01R 13/193; H01R 13/15
(Continued)

(56) References Cited

U.S. PATENT DOCUMENTS 10,084,263 B1 * 9/2018 Shi ......................... H01R 4/483
10,270,205 B2 * 4/2019 Nishio ............. H01R 13/62938
(Continued)

FOREIGN PATENT DOCUMENTS

JP H10-312867 A 11/1998
JP 2000-139919 A 5/2000
JP 2016-006754 A 1/2016

*Primary Examiner* — Harshad C Patel
(74) *Attorney, Agent, or Firm* — Venjuris, P.C.

(57) ABSTRACT

A connector is disclosed which can improve a contact pressure between terminals while suppressing terminal wear at the time of inserting and withdrawing the connector. A connector is provided with a housing having a mating terminal insertion region, a terminal accommodated in the housing to face the mating terminal insertion region, and a contact pressure applying component to be accommodated into the housing and holdable at a first position facing the terminal and a second position in contact with the terminal. A mating terminal is insertable into the mating terminal insertion region with the contact pressure applying component held at the first position. The contact pressure applying component contacts the terminal and presses the terminal toward the mating terminal inserted into the mating terminal insertion region with the contact pressure applying component held at the second position.

8 Claims, 18 Drawing Sheets

(58) Field of Classification Search
USPC .......................................... 439/259, 833, 635
See application file for complete search history.

(56) References Cited

U.S. PATENT DOCUMENTS

| | | | | |
|---|---|---|---|---|
| 12,308,590 | B2 * | 5/2025 | Wittmann | H01R 13/193 |
| 2014/0322965 | A1 * | 10/2014 | Kuji | H01R 13/639 439/527 |
| 2016/0056573 | A1 * | 2/2016 | Kamei | H01R 13/62977 439/660 |
| 2020/0388959 | A1 * | 12/2020 | Furugoori | H01R 13/7032 |
| 2021/0075139 | A1 * | 3/2021 | Kitaoka | H01R 13/18 |
| 2022/0094085 | A1 * | 3/2022 | Kitaoka | H01R 4/30 |

* cited by examiner

CONNECTOR WITH CONTACT PRESSURE APPLYING COMPONENT

CROSS REFERENCE TO RELATED APPLICATIONS

This application is a national phase of PCT application No. PCT/JP2022/009875, filed on 8 Mar. 2022, which claims priority from Japanese patent application No. 2021-043146, filed on 17 Mar. 2021, all of which are incorporated herein by reference.

TECHNICAL FIELD

The present disclosure relates to a connector.

BACKGROUND

Patent Document 1 discloses a connector in which a housing of one connector and a housing of another connector are displaced to a connected state and a separated state by the rotation of a lever. In connecting/separating the one and the other connectors, a terminal of the one connector and a terminal of the other connector are displaced in mutually opposite directions along a connecting/separating direction while being held in contact.

PRIOR ART DOCUMENT

Patent Document

Patent Document 1: JP 2016-006754 A

SUMMARY OF THE INVENTION

Problems to be Solved

In such a connector, a contact part of the one and the other terminals are worn by repeating the insertion and withdrawal of the one and the other connectors. As a result, wear debris may be produced due to the wear of surface plating of each terminal and a resistance value of the contact part may increase. In the connector of Patent Document 1, a structure is proposed which separates the wear debris from the contact part of the both terminals by returning the both terminals in the separating direction from positions where a fitting depth of the one and the other terminal is largest.

However, with the use of large current of recent years, a contact pressure between terminals is required to be increased to reduce contact resistance between the both terminals. Thus, the wear of surface plating of each terminal more easily occurs and there are possible cases which cannot be sufficiently dealt with by the measures of Patent Document 1.

Accordingly, a connector is disclosed which can improve a contact pressure between terminals while suppressing terminal wear at the time of inserting and withdrawing the connector.

Means to Solve the Problem

The present disclosure is directed to a connector with a housing having a mating terminal insertion region, a terminal accommodated in the housing to face the mating terminal insertion region, and a contact pressure applying component to be accommodated into the housing, the contact pressure applying component being holdable at a first position and a second position, a mating terminal being insertable into the mating terminal insertion region with the contact pressure applying component held at the first position, and the contact pressure applying component contacting the terminal and pressing the terminal toward the mating terminal inserted into the mating terminal insertion region with the contact pressure applying component held at the second position.

Effect of the Invention

According to the connector of the present disclosure, a contact pressure between terminals can be improved while terminal wear is suppressed at the time of inserting and withdrawing the connector.

DETAILED DESCRIPTION TO EXECUTE THE INVENTION

Description of Embodiments of Present Disclosure

Figure 1:
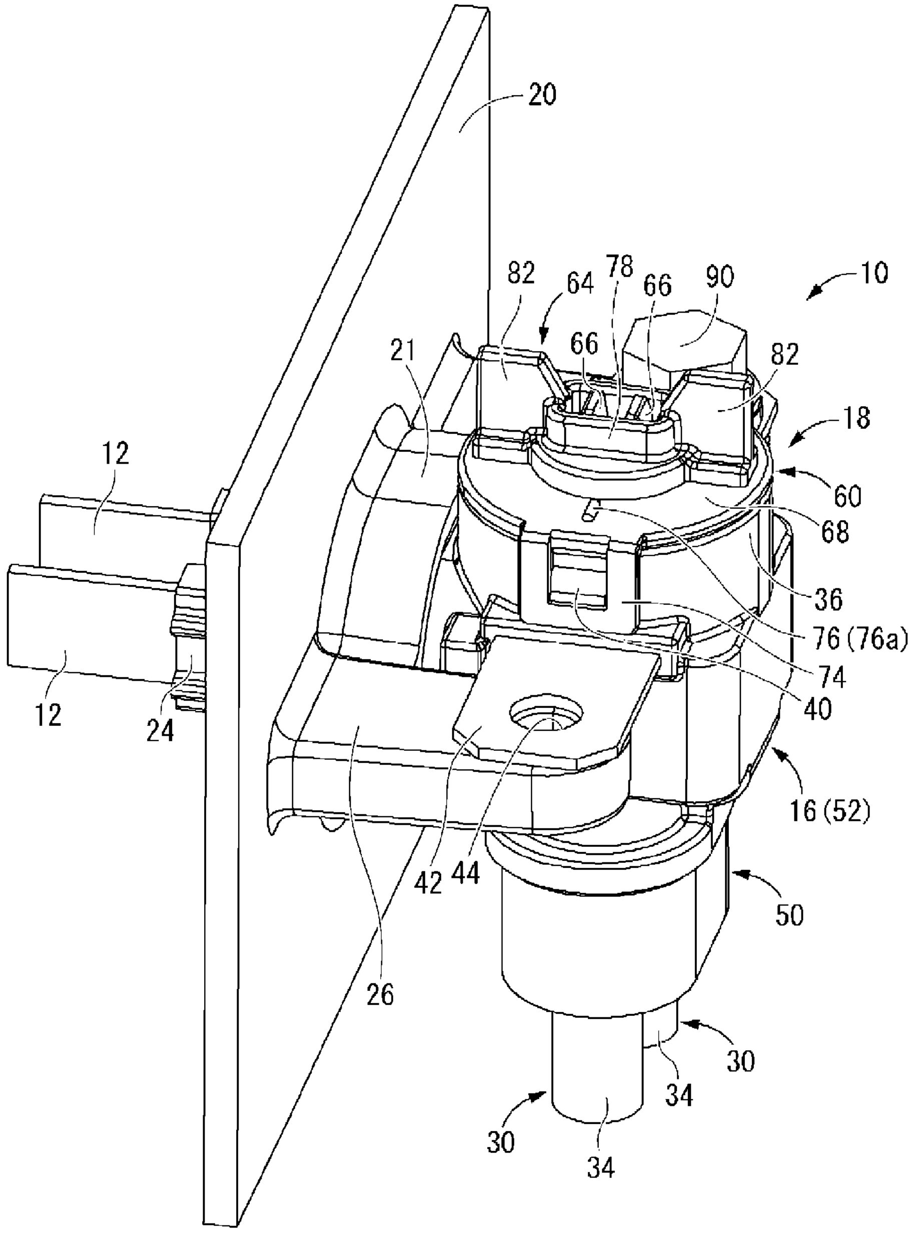
FIG. 1 is an overall perspective view of a connector according to a first embodiment showing a state where a contact pressure applying component is held at a first position.
Figure 2:
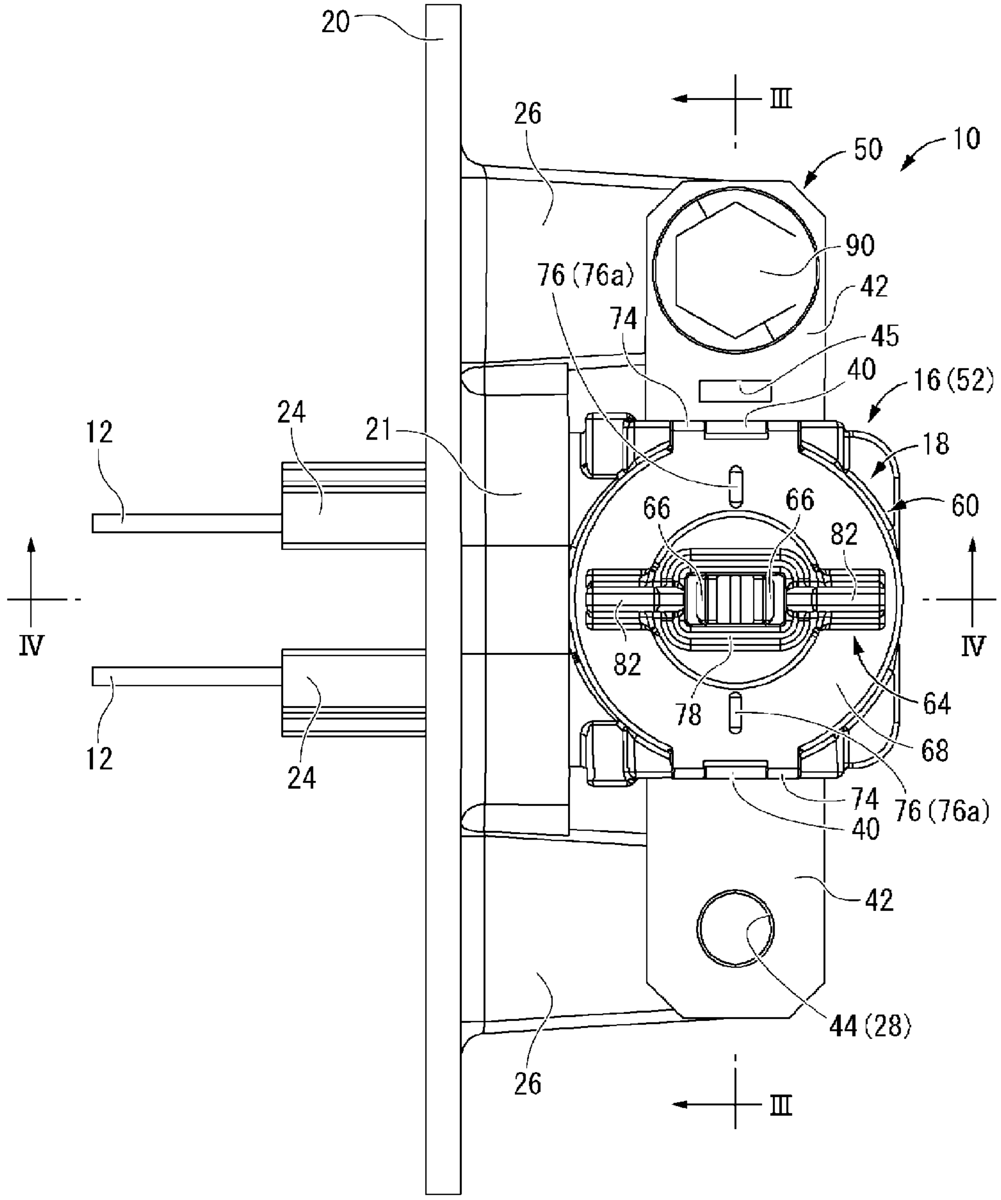
FIG. 2 is a plan view of the connector shown in FIG. 1.

First, embodiments of the present disclosure are listed and described.

(1) The connector of the present disclosure is provided with a housing having a mating terminal insertion region, a terminal accommodated in the housing to face the mating terminal insertion region, and a contact pressure applying component to be accommodated into the housing, the contact pressure applying component being holdable at a first position and a second position, a mating terminal being insertable into the mating terminal insertion region with the contact pressure applying component held at the first position, and the contact pressure applying component contacting the terminal and pressing the terminal toward the mating terminal inserted into the mating terminal insertion region with the contact pressure applying component held at the second position.

According to the present disclosure, the contact pressure applying component accommodated in the housing is displaceable to the first position and the second position, the insertion of the mating terminal into the mating terminal insertion region is allowed at the first position, and the contact pressure applying component can press and apply a contact pressure to the mating terminal at the second position. Thus, it is avoided that the terminal is moved and pressed against the mating terminal with a high contact pressure from an insertion stage of the mating terminal into the mating terminal insertion region. In this way, it is possible to suppress or prevent the wear of a contact part of the mating terminal and the terminal in the insertion stage of the mating terminal into the mating terminal insertion region. In addition, the contact pressure applying component is held at the second position when the insertion of the mating terminal into the mating terminal insertion region is completed, whereby the contact pressure applying component can be brought into contact with the terminal and the terminal can be displaced toward the mating terminal insertion region and pressed against the mating terminal. As a result, the terminal can be brought into contact with the mating terminal with a high contact pressure, and a contact pressure between the terminals can be improved.

Note that, with the contact pressure applying component held at the first position, the terminal may contact the mating terminal inserted into the mating terminal insertion region with a small contact pressure or may be separated therefrom. This is because the wear between the terminals can be suppressed since a high contact pressure is not applied even if the terminal is in contact with the mating terminal.

(2) Preferably, the terminal is separated from the mating terminal with the contact pressure applying component held at the first position. This is because the wear of the contact part of the mating terminal and the terminal in the insertion stage of the mating terminal into the mating terminal insertion region can be prevented since the terminal does not contact the mating terminal being inserted into the mating terminal insertion region.

(3) Preferably, the housing has a pair of the mating terminal insertion regions arranged in parallel and a pressing protrusion accommodation region provided between the pair of mating terminal insertion regions in a first direction intersecting an insertion direction of the mating terminals into the respective mating terminal insertion regions, a pair of the terminals are respectively arranged between the pressing protrusion accommodation region and the mating terminal insertion regions in the first direction, the contact pressure applying component includes a pressing protrusion projecting in a second direction intersecting the insertion direction and the first direction and to be accommodated into the pressing protrusion accommodation region, the pressing protrusion is rotatable about an axis of rotation along the second direction with respect to the housing, the pressing protrusion has a large width direction and a small width direction, the pressing protrusion having a large radial dimension orthogonal to the axis of rotation along the large width direction and a smaller radial dimension along the small width direction than along the large width direction, the contact pressure applying component is switchable to the first position and the second position by rotation of the pressing protrusion about the axis of rotation, the pressing protrusion is facing the terminals in the small width direction in the first direction when the contact pressure applying component is at the first position, and the pressing protrusion contacts the terminals in the large width direction in the first direction to press the terminals toward the mating terminals when the contact pressure applying component is at the second position.

The pressing protrusion of the contact pressure applying component is rotatably held in the housing and the contact pressure applying component can be switched to the first position and the second position only by rotating the pressing protrusion of the contact pressure applying component. Thus, the operability of the contact pressure applying component can be improved. Moreover, since the pair of terminals and the pressing protrusion of the contact pressure applying component can be arranged, making good use of a space between the pair of mating terminal insertion regions arranged in parallel, the connector can be reduced in size.

(4) Preferably, in (1) or (2) described above, the housing has a pair of the mating terminal insertion regions arranged in parallel and a pressing protrusion accommodation region provided between the pair of mating terminal insertion regions in a first direction intersecting an insertion direction of the mating terminals into the respective mating terminal insertion regions, a pair of the terminals are respectively arranged between the pressing protrusion accommodation region and the mating terminal insertion regions in the first direction, the contact pressure applying component includes a pressing protrusion projecting in a second direction intersecting the insertion direction and the first direction and to be accommodated into the pressing protrusion accommodation region, the pressing protrusion is displaceable in the second direction with respect to the housing, the contact pressure applying component is switchable to the first position and the second position by a displacement of the pressing protrusion in the second direction, the pressing protrusion is arranged at a position deviated from the pressing protrusion accommodation region in the second direction and the mating terminals are facing the terminals in the first direction when the contact pressure applying component is at the first position, and the pressing protrusion is arranged in the pressing protrusion accommodation region and contacts the terminals in the first direction to press the terminals toward the mating terminals when the contact pressure applying component is at the second position.

The pressing protrusion of the contact pressure applying component is held in the housing displaceably in the second direction. The contact pressure applying component can be switched to the first position and the second position only by displacing the pressing protrusion of the contact pressure applying component in the second direction. Thus, the operability of the contact pressure applying component can be improved. Moreover, since the pair of terminals and the pressing protrusion of the contact pressure applying component can be arranged, making good use of a space between the pair of mating terminal insertion regions arranged in parallel, the connector can be reduced in size.

(5) Preferably, in (3) or (4) described above, the housing includes an open tube portion open to expose the pressing protrusion accommodation region to outside in the second direction, the contact pressure applying component includes an engaging portion to be engaged with the open tube portion of the housing and a rotating base holding the pressing protrusion and held on the engaging portion rotatably about an axis of rotation, and the connector includes an annular first sealing ring to be arranged between and pressed in contact with facing surfaces of the open tube portion and the engaging portion and an annular second sealing ring to be arranged between and pressed in contact with facing surfaces of the rotating base and the engaging portion.

Since the contact pressure applying component includes the engaging portion to be engaged with the open tube portion of the housing, the contact pressure applying component can be stably fixed to the housing and the assembling workability of the contact pressure applying component with the housing can also be improved. Further, reaction forces received from the terminals by the pressing protrusion pressing the terminals at the second position of the contact pressure applying component can be stably distributed to the housing via the rotating base and the engaging portion, and a contact pressure applying function of the contact pressure applying component can be stably exhibited. Furthermore, even if a structure for switching the contact pressure applying component to the first position and the second position by the rotation of the pressing protrusion is adopted, the waterproofness of the housing can be stably ensured since the connector includes the annular first sealing ring to be arranged between and pressed in contact with the facing surfaces of the open tube portion and the rotating base and the annular second sealing ring to be arranged between and pressed in contact with the facing surfaces of the rotating base and the pressing protrusion.

(6) Preferably, in (5) described above, the contact pressure applying component includes a rotation lever projecting on a surface of the engaging portion, the rotation lever rotating integrally with the rotating base. Since the rotation lever configured to rotate integrally with the rotating base projects on the surface of the engaging portion, an operation of rotationally displacing the contact pressure applying component can be easily performed from the outside of the housing.

(7) Preferably, the connector includes a first lock portion for holding the contact pressure applying component at the first position and a second lock portion for holding the contact pressure applying component at the second position. The contact pressure applying component can be stably held at the first position and the second position by the first and second lock portions. Therefore, it is possible to suppress wear between the terminals and stably provide an effect of improving a contact pressure between the terminals.

DETAILS OF EMBODIMENTS OF PRESENT DISCLOSURE

Specific examples of a connector of the present disclosure are described below with reference to the drawings. Note that the present disclosure is not limited to these illustrations, but is represented by claims and intended to include all changes in the scope of claims and in the meaning and scope of equivalents.

First Embodiment

Hereinafter, a connector 10 of a first embodiment of the present disclosure is described using FIGS. 1 to 10. The connector 10 is provided with terminals 14 electrically connectable to mating terminals 12 in a terminal block provided in a device such as an inverter, a housing 16 for accommodating the terminals 14 and a contact pressure applying component 18 holdable at a first position and a second position to be described later. Note that the connector 10 can be arranged in an arbitrary direction, but an upper side is an upper side in FIG. 3, a lower side is a lower side in FIG. 3, a left side is a left side in FIG. 3, a right side is a right side in FIG. 3, a front side is a right side in FIG. 2 and a rear side is a left side in FIG. 2 in the following description. Further, in the following description, a lateral direction may be referred to as a first direction, a vertical direction orthogonal to the first direction may be referred to as a second direction, and a front-rear direction orthogonal to the first and second directions may be referred to as an insertion direction of the mating terminals 12 into later-described mating terminal insertion regions 54. Further, for a plurality of identical members, only some members may be denoted by a reference sign and the other members may not be denoted by the reference sign.

The structure of the device such as an inverter including the mating terminals 12 is not limited but, in this embodiment, a mounting tube portion 21 projecting forward is provided on a mounting portion 20 of the device. This mounting tube portion 21 has a substantially elliptical outer shape corresponding to an inserting tube portion 38 to be described later. An opening 22 is formed to penetrate through the mounting tube portion 21, and the mating terminals 12 project toward the outside of the device (right side in FIG. 2) from the inside of the device (left side in FIG. 2) through this opening 22. Particularly, in this embodiment, a pair of the mating terminals 12, 12 are provided and separated from and facing each other in the lateral direction. These mating terminals 12, 12 are respectively held by resin members 24, 24 constituting the terminal block provided on the device. A pair of leg portions 26, 26 project from the mounting portion 20 toward the outside of the device, and bolt insertion holes 28 are formed on the projecting tips of the respective leg portions 26. Note that, in FIGS. 1 to 5, the connector 10 is shown in a state where the contact pressure applying component 18 is at the first position and is mounted on the mounting portion 20 of the device roughly shown to have a flat plate shape.

<Terminals 14>

Figure 3:
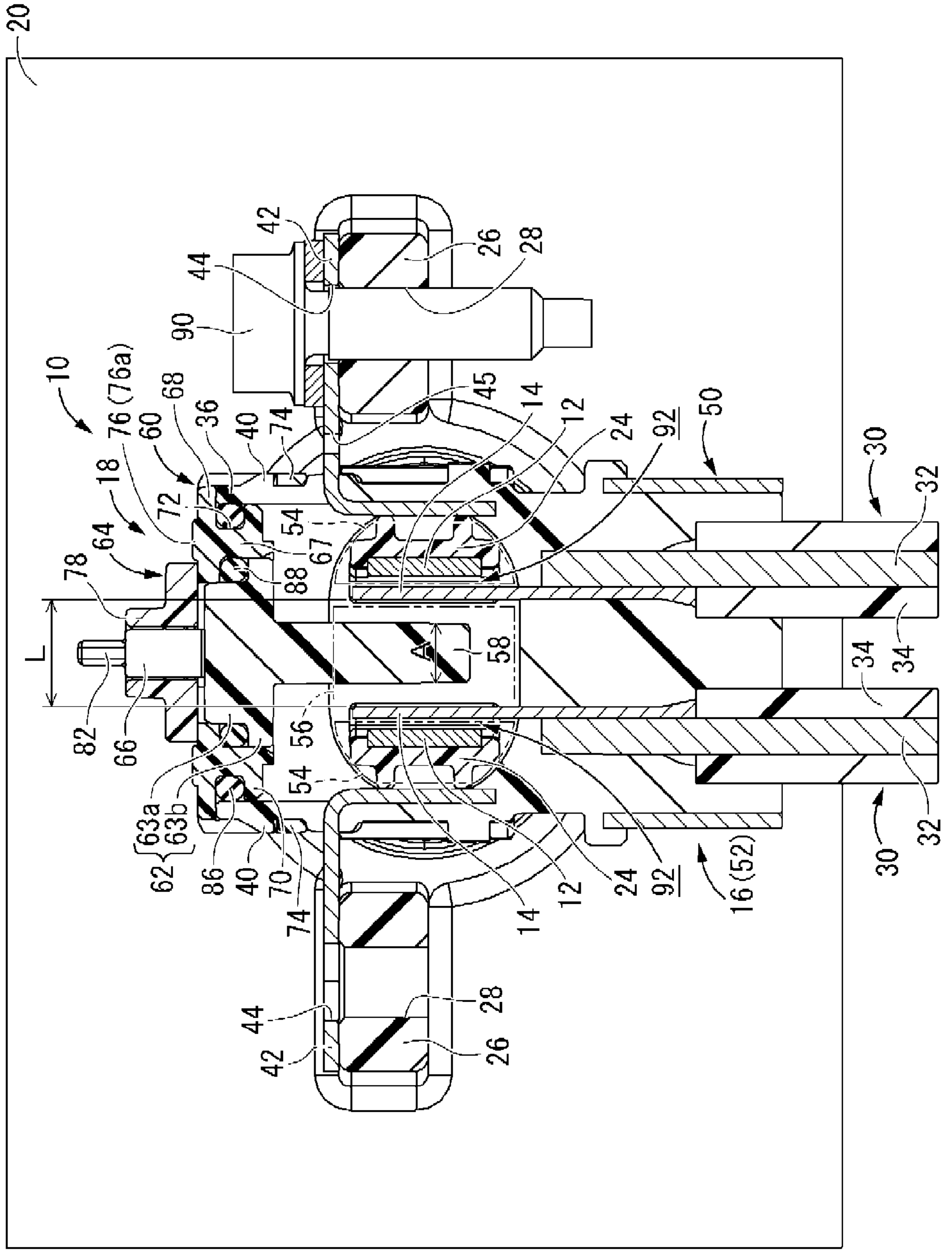
FIG. 3 is a section along III-III in FIG. 2.

In this embodiment, as shown in FIG. 3, a pair of the terminals 14, 14 are provided apart from each other in the lateral direction. Each terminal 14 extends in the vertical direction, and is electrically connected to a wire 30 at an end part (lower end part) opposite to an end part (upper end part) on a side to be connected to the mating terminal 12. This wire 30 is a coated wire, and a core wire 32 is covered by an insulation coating 34. The insulation coating 34 is stripped to expose the core wire 32 on an end part of the wire 30, and the terminal 14 is electrically connected to the end part of the wire 30 by fixing the exposed core wire 32 to the lower end part of the terminal 14 by a means such as crimping.

<Housing 16>

Figure 5:
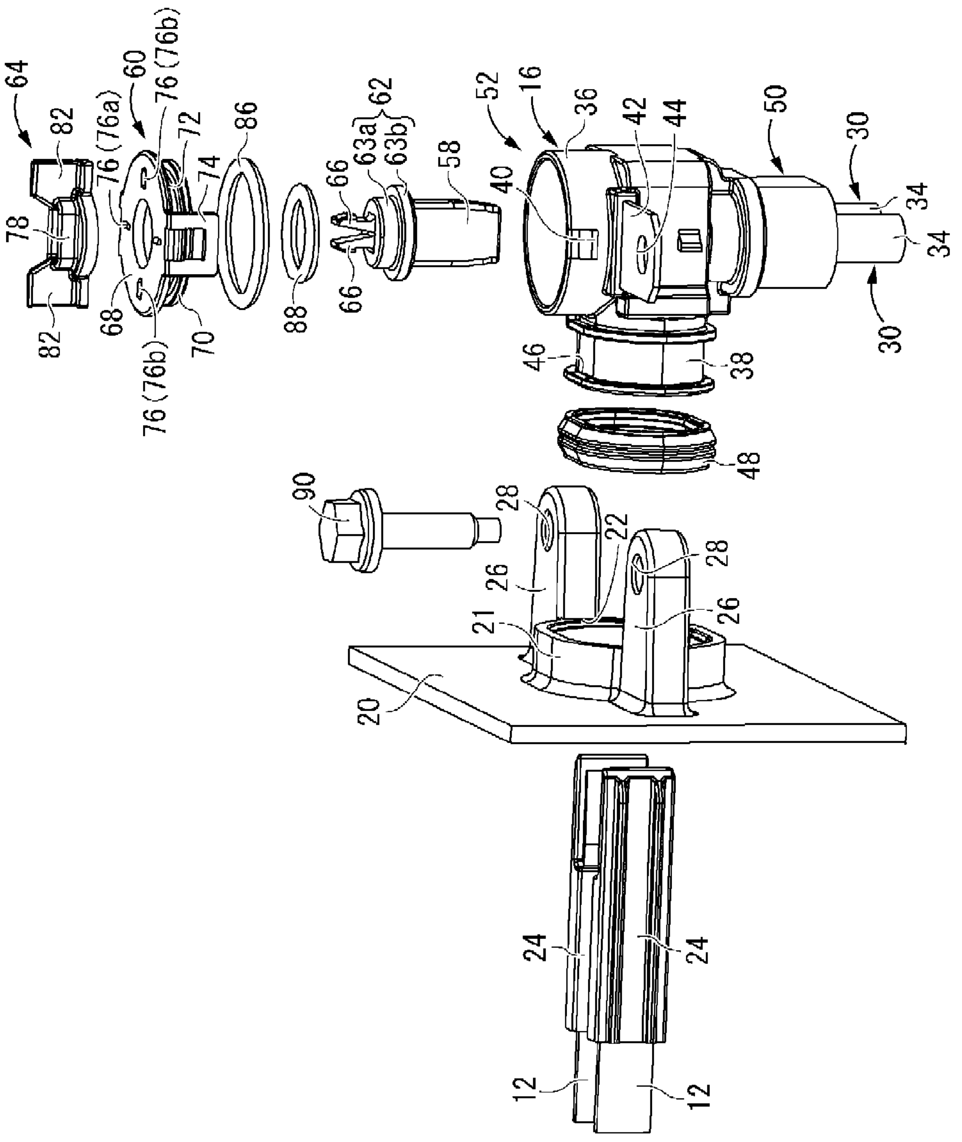
FIG. 5 is an exploded perspective view of the connector shown in FIG. 1.

The housing 16 for accommodating the terminals 14 has a hollow shape and includes an open tube portion 36 extending in the vertical direction (second direction) and the inserting tube portion 38 extending in the front-rear direction (insertion direction of the mating terminals 12). That is, the internal space of the housing 16 communicates with outside through an upper opening in the open tube portion 36 and through a rear opening in the inserting tube portion 38. Since the internal space of the housing 16 includes a pressing protrusion accommodation region 56 as described later, the pressing protrusion accommodation region 56 is open upward (second direction) through the open tube portion 36. In this embodiment, the open tube portion 36 has a substantially true circular outer shape, and the inserting tube portion 38 has a substantially elliptical outer shape. Further, engaging protrusions 40 projecting outward are provided on the outer peripheral surface of the open tube portion 36. In this embodiment, a pair of the engaging protrusions 40, 40 are provided on both sides in the lateral direction. Mounting plate portions 42, 42 projecting toward both sides in the lateral direction are provided on an upper part of the housing 16, and a bolt insertion hole 44 is formed in the projecting tip of each mounting plate portion 42. A through hole 45 penetrating through the mounting plate portion 42 in a plate thickness direction is formed separately from the bolt insertion hole 44 in one (right one in this embodiment) mounting plate portion 42. Further, a recessed groove 46 open toward an outer peripheral side is formed over an entire circumference in a circumferential direction on the outer peripheral surface of the inserting tube portion 38. As also shown in FIG. 5 and the like, an annular water stop member 48 made of an elastic material such as rubber is mounted into this recessed groove 46.

Figure 6:
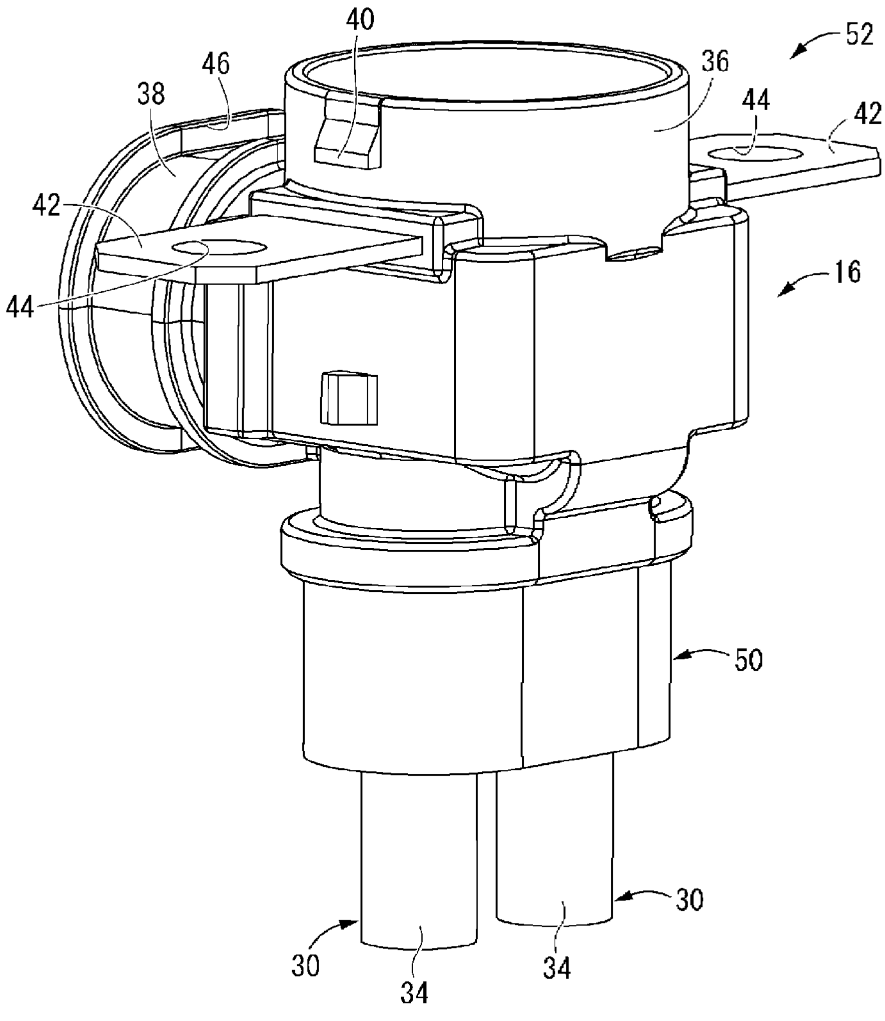
FIG. 6 is a perspective view showing an integrally molded article constituting the connector shown in FIG. 1.
Figure 7:
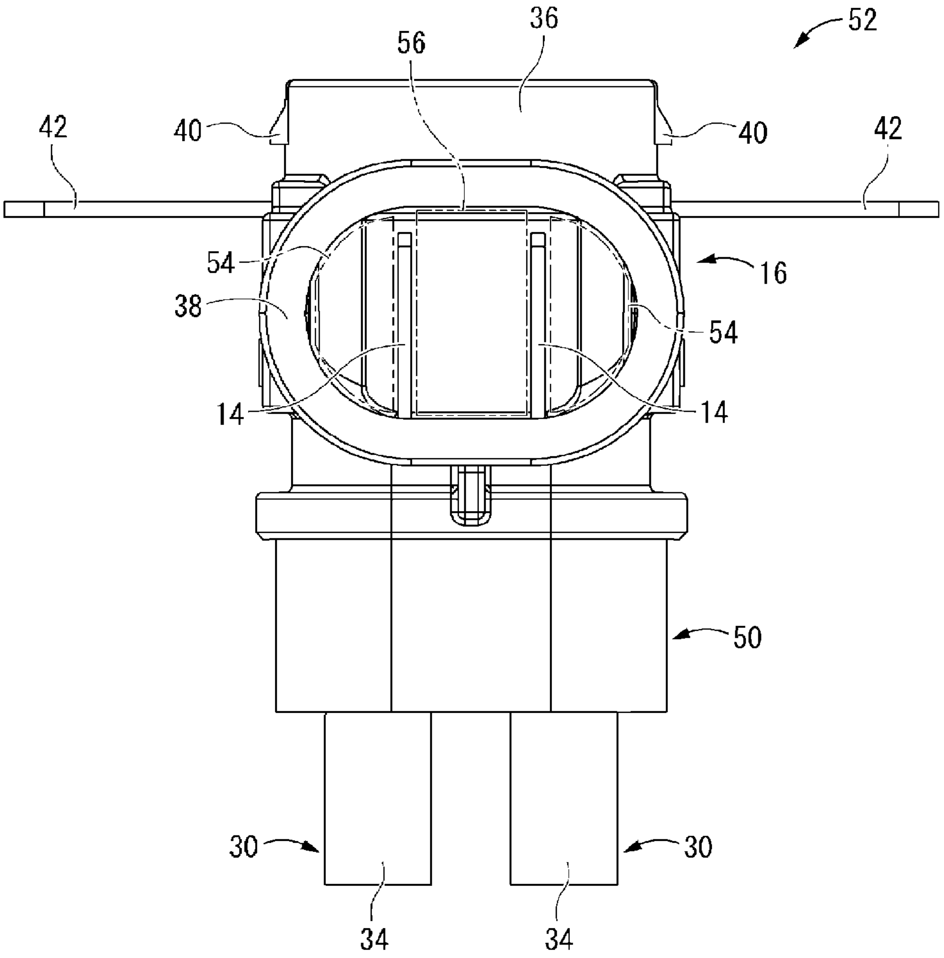
FIG. 7 is a back view of the integrally molded article shown in FIG. 6.

The housing 16 is mainly formed of synthetic resin in this embodiment, but partially formed of metal. That is, the pair of mounting plate portions 42, 42 are formed of metal and a part for fixing the wires 30 connected to the respective terminals 14 in a lower part of the housing 16 is covered by an annular member made of metal over an entire circumference. In this way, the strength of the housing 16 can be improved as compared to the case where a housing is, for example, formed only of synthetic resin. Particularly, in this embodiment, the pair of mounting plate portions 42, 42 and the annular member in the lower part of the housing 16 are constituted by one metal member 50. As shown in FIGS. 6 and 7, the housing 16 is formed as an integrally molded article 52 including the terminals 14 connected to the respective wires 30 and the metal member 50.

That is, as also shown in FIG. 3, the end parts of the wires 30 connected to the respective terminals 14 are fixed in a state embedded in the housing 16 and the end parts (upper end parts) of the respective terminals 14 opposite to the sides to be connected to the wires 30 are projecting into the internal space of the housing 16. The respective terminals 14 projecting into the internal space of the housing 16 are exposed to outside through the open tube portion 36 and the inserting tube portion 38. These respective terminals 14 projecting into the internal space of the housing 16 are relatively thin and resiliently deformable in the plate thickness direction (first direction). Here, as shown by two-dot chain lines in FIG. 7, regions outward of the pair of terminals 14, 14 in the lateral direction in the internal space of the housing 16 are the mating terminal insertion regions 54, 54, into which the mating terminals 12, 12 are inserted. That is, the pair of mating terminal insertion regions 54, 54 are arranged in parallel in the lateral direction. Each terminal 14 and each mating terminal insertion region 54 are facing each other in the first direction (lateral direction). Further, out of a region between the pair of mating terminal insertion regions 54, 54 facing each other in the first direction (lateral direction), particularly a region between the pair of terminals 14, 14 facing each other is the pressing protrusion accommodation region 56 for accommodating a pressing protrusion 58 to be described later. In short, the terminals 14 are arranged between the pressing protrusion accommodation region 56 and the respective mating terminal insertion regions 54 in the first direction (lateral direction).

<Contact Pressure Applying Component 18>

Figure 4:
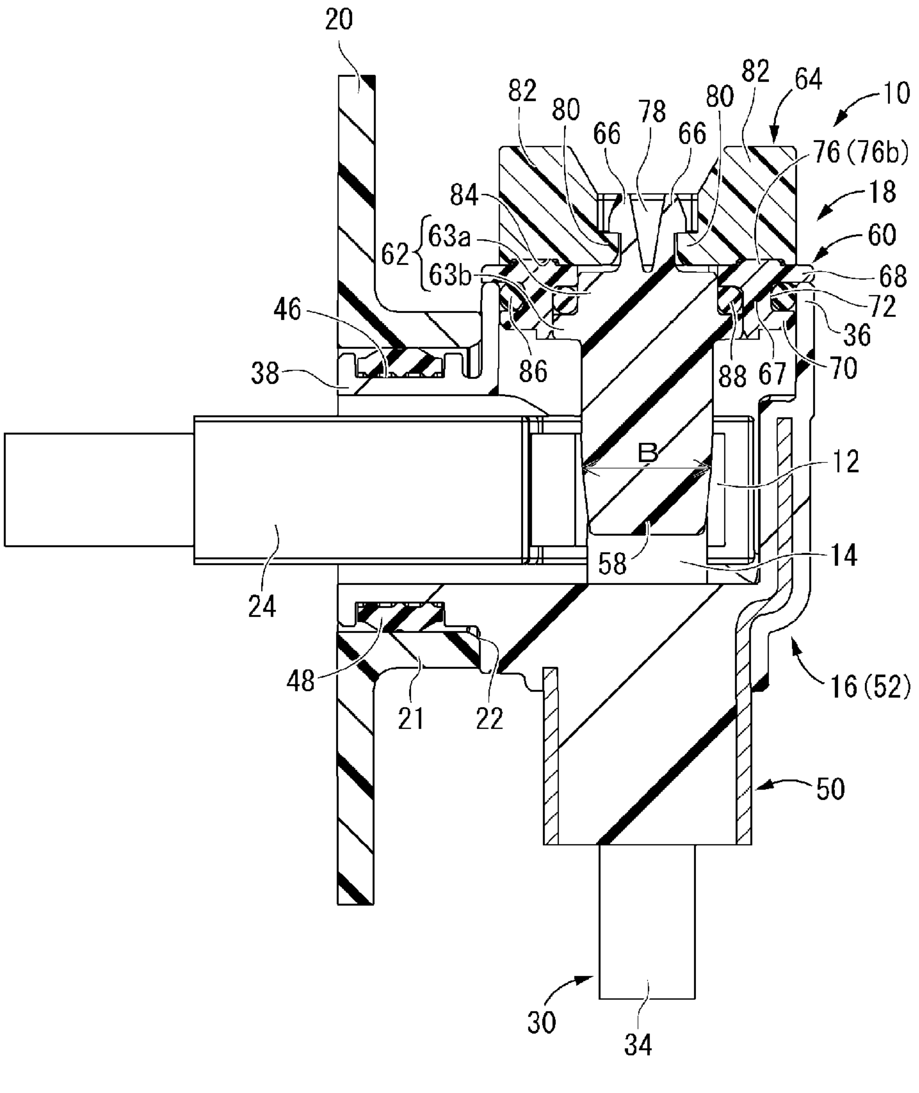
FIG. 4 is a section along IV-IV in FIG. 2.

The contact pressure applying component 18 includes the pressing protrusion 58 to be accommodated into the pressing protrusion accommodation region 56 between the pair of terminals 14, 14. The pressing protrusion 58 of this embodiment has a substantially rectangular plate shape and has predetermined dimensions in the vertical direction, lateral direction and front-rear direction with the contact pressure applying component 18 located at the first position as shown in FIGS. 1 to 5. Specifically, a lateral dimension of the pressing protrusion 58 in FIG. 3, which is a radial dimension when a center axis extending in the vertical direction is assumed, is smaller than a lateral dimension in FIG. 4, which is likewise a radial dimension. The lateral direction in FIG. 3 is a small width direction A of the pressing protrusion 58 and the lateral direction in FIG. 4 is a large width direction B of the pressing protrusion 58. In this embodiment, the dimension of the pressing protrusion 58 in the small width direction A is smaller than a distance L (see FIG. 3) between facing surfaces of the pair of terminals 14, 14 and the dimension of the pressing protrusion 58 in the large width direction B is larger than the distance L between the facing surfaces of the pair of terminals 14, 14.

Further, the contact pressure applying component 18 includes an engaging portion 60 to be engaged with the open tube portion 36 of the housing 16 and a rotating base 62 holding the pressing protrusion 58 and rotatably held on the engaging portion 60. Furthermore, the contact pressure applying component 18 includes a rotation lever 64 projecting on a surface of the engaging portion 60 and configured to rotate integrally with the rotating base 62. The rotating base 62 is integrally formed above the pressing protrusion 58. In other words, the pressing protrusion 58 is provided to project downward (second direction) from the rotating base 62. The rotating base 62 includes a pair of locking claws 66, 66 projecting upward and facing each other in an upper end part. The pair of the locking claws 66, 66 are resiliently deformable in facing directions. The rotating base 62 of this embodiment has a substantially stepped cylindrical shape, an upper part thereof is a small-diameter portion 63*a* and a lower part thereof is a large-diameter portion 63*b*.

As also shown in FIGS. 3 to 5, the engaging portion 60 has a substantially hollow cylindrical shape including a peripheral wall 67 as a whole, and ring-shaped upper and lower annular portions 68, 70 are respectively provided on upper and lower end parts of the peripheral wall 67. That is, the upper annular portion 68 projects toward an outer peripheral side from the upper end part of the peripheral wall 67, and the lower annular portion 70 projects toward the outer peripheral side from the lower end part of the peripheral wall 67. Further, the upper annular portion 68 also projects toward an inner peripheral side in the upper end part of the peripheral wall 67. In the engaging portion 60, a peripheral groove 72 open toward the outer peripheral side and extending in a circumferential direction is formed in a vertical gap between the upper and lower annular portions 68, 70. Further, engaging frame bodies 74 to be engaged with the respective engaging protrusions 40 in the housing 16 are provided on both sides in the lateral direction of the engaging portion 60. Specifically, the respective frame-shaped engaging frame bodies 74, 74 are provided to project downward from both sides in the lateral direction of an outer peripheral end part of the upper annular portion 68.

Further, lock protrusions 76 projecting upward are provided on the upper end surface of the upper annular portion 68. In this embodiment, a pair of the lock protrusions 76*a*, 76*a* are provided on both sides in the lateral direction and a pair of lock protrusions 76*b*, 76*b* are provided on both sides in the front-rear direction. These lock protrusions 76*a*, 76*b* are separated from each other in the circumferential direction and respectively extend in a radial direction of the engaging portion 60.

The rotation lever 64 is provided with a substantially elliptical tubular portion 78 in a central part, and inner peripheral protrusions 80, 80 projecting toward the inner peripheral side are provided on both sides in a major axis direction (both sides in the lateral direction in FIG. 4) on the inner peripheral surface of the tubular portion 78. Further, grip portions 82, 82 projecting outward are provided on both sides in the major axis direction on the outer peripheral surface of the tubular portion 78, and lock recesses 84, into which the respective lock protrusions 76*a*, 76*b* of the engaging portion 60 are fit, are provided in the lower surfaces of the respective grip portions 82. Each of these lock recesses 84 is closed on a lateral wall portion. Thus, when the respective lock protrusions 76*a*, 76*b* enter the lock recesses 84 as described later, the lateral wall portions of the lock recesses 84 and/or the respective lock protrusions 76*a*, 76*b* are resiliently deformed and the respective lock protrusions 76*a*, 76*b* ride over the lateral wall portions of the lock recesses 84. In this way, a user can feel a moderation feeling in switching the contact pressure applying component 18 between the first position and the second position by rotating the rotation lever 64 about an axis of rotation as described later.

These pressing protrusion 58, rotating base 62, engaging portion 60 and rotation lever 64 are assembled with each other, thereby configuring the contact pressure applying component 18. That is, the rotating base 62 is inserted into an inner hole of the engaging portion 60 from below, and the respective locking claws 66 project further upward than the engaging portion 60. Further, the rotation lever 64 is overlapped on the engaging portion 60 from above, and the respective locking claws 66 projecting further upward than the engaging portion 60 are inserted into the tubular portion 78 of the rotation lever 64 from below and locked to the respective inner peripheral protrusions 80. In this way, the pressing protrusion 58, the rotating base 62 and the rotation lever 64 are assembled with the engaging portion 60 rotatably about the axis of rotation along the vertical direction (second direction). Since the engaging portion 60 is fixedly mounted in the housing 16 as described later, the pressing protrusion 58 is rotatable about the axis of rotation with respect to the housing 16. In this embodiment, the large width direction B of the pressing protrusion 58 and the major axis direction of the tubular portion 78 (projecting direction of the grip portions 82, 82) are the same direction.

<First Sealing Ring 86 and Second Sealing Ring 88>

With the contact pressure applying component 18 to be described later assembled with the housing 16 (integrally molded article 52), an outer peripheral opening of the peripheral groove 72 in the engaging portion 60 is covered by the open tube portion 36 of the housing 16 to form an annular space. An annular first sealing ring 86 made of an elastic material such as rubber is arranged in this annular space. Further, by assembling the rotating base 62 and the engaging portion 60, an annular space is formed in a vertical gap between the large-diameter portion 63*b* of the rotating base 62 and a part projecting more toward the inner peripheral side than the peripheral wall 67 in the upper annular portion 68 of the engaging portion 60. An annular second sealing ring 88 made of an elastic material such as rubber is arranged in this annular space. The first sealing ring 86 is arranged between and pressed in contact with the facing surfaces of the open tube portion 36 and the engaging portion 60 in a radial direction of the housing 16, which is a direction orthogonal to the axis of rotation. In this way, a gap between the open tube portion 36 (housing 16) and the engaging portion 60 is sealed in a liquid-tight manner. Further, the second sealing ring 88 is arranged between and pressed in contact with the facing surfaces of the rotating base 62 and the engaging portion 60 in the radial direction of the housing 16 orthogonal to the axis of rotation and/or in the vertical direction, which is the same direction as the axis of rotation. In this way, a gap between the rotating base 62 and the engaging portion 60 is sealed in a liquid-tight manner.

<Assembling Method of Connector 10>

The connector 10 is, for example, assembled by the following method. First, the integrally molded article 52 made of synthetic resin and provided with the terminals 14 connected to the respective wires 30 and the metal member 50 is prepared. Further, with the second sealing ring 88 arranged inside, the pressing protrusion 58, the rotating base 62, the engaging portion 60 and the rotation lever 64 are assembled to configure the contact pressure applying component 18. Then, with the first sealing ring 86 arranged in the peripheral groove 72 in the contact pressure applying component 18 (engaging portion 60), the contact pressure applying component 18 is inserted through the open tube portion 36 in the integrally molded article 52 (housing 16). Further, the engaging protrusions 40 of the housing 16 are engaged with the engaging frame bodies 74 of the engaging portion 60. In this way, the engaging portion 60 in the contact pressure applying component 18 is fixedly assembled with the housing 16, and the outer peripheral end part of the upper annular portion 68 in the engaging portion 60 is overlapped on the upper opening edge part of the open tube portion 36 to close the upper opening of the housing 16 (open tube portion 36).

As a result, the contact pressure applying component 18 is assembled with the integrally molded article 52, and a projecting tip side of the pressing protrusion 58 held on the rotating base 62 is accommodated into the pressing protrusion accommodation region 56 between the pair of terminals 14, 14. Further, in this state, the first sealing ring 86 is compressed between the open tube portion 36 and the engaging portion 60 as described above, thereby sealing the gap between these in a liquid-tight manner. Further, the second sealing ring 88 is compressed between the engaging portion 60 and the rotating base 62, thereby sealing the gap between these in a liquid-tight manner. Furthermore, the water stop member 48 is mounted into the recessed groove 46 in the inserting tube portion 38 from outside. In this way, the connector 10 is completed.

In an initial state shown in FIGS. 1 to 5, a facing direction of the pair of terminals 14, 14 is the small width direction A of the pressing protrusion 58 particularly as shown in FIGS. 3 and 4, and each terminal 14 and the pressing protrusion 58 are facing across a gap in the first direction (lateral direction). Further, each terminal 14 and the pressing protrusion 58 extend in parallel in the large width direction B of the pressing protrusion 58. In this state, the grip portions 82, 82 provided on the upper end part of the contact pressure applying component 18 extend in the front-rear direction and are facing each other, and the lock protrusions 76*b*, 76*b* located on the both sides in the front-rear direction are fit in the lock recesses 84 provided in the lower surfaces of the respective grip portions 82. By the contact of the respective lock protrusions 76*b* with the both lateral wall portions of the lock recesses 84, the contact pressure applying component 18 is prevented from unintentionally rotating about the center axis serving as the axis of rotation with respect to the housing 16 (integrally molded article 52). That is, in the initial state, the contact pressure applying component 18 is held at the first position where the pressing protrusion 58 and the terminals 14 are separated from and facing each other in the first direction. Therefore, in this embodiment, a first lock portion for holding the contact pressure applying component 18 at the first position is configured to include the lock protrusions **76*b*, 76*b* located on the both sides in the front-rear direction and the lock recesses 84, 84**.

The connector 10 assembled in this way is mounted on the mounting portion 20 of the device. Specifically, the inserting tube portion 38 of the connector 10 is inserted into the mounting tube portion 21 of the mounting portion 20, one leg portion 26 and one mounting plate portion 42 (respectively right ones in this embodiment) are overlapped and fastened by a bolt 90 inserted through the bolt insertion holes 28, 44 thereof. By inserting the inserting tube portion 38 into the mounting tube portion 21, the water stop member 48 externally fit to the inserting tube portion 38 is compressed between the mounting tube portion 21 and the inserting tube portion 38, thereby sealing a gap between the mounting tube portion 21 and the inserting tube portion 38 in a liquid-tight manner.

By mounting the connector 10 on the mounting portion 20 with the contact pressure applying component 18 held at the first position, the respective mating terminals 12 projecting forward (toward the connector 10) in the mounting tube portion 21 are inserted into the mating terminal insertion regions 54 located outside the respective terminals 14 in the lateral direction in the internal space of the housing 16. In this way, the respective terminals 14 and the respective mating terminals 12 face each other in the first direction (lateral direction). In this embodiment, as shown in FIG. 3, the respective terminals 14 and the respective mating terminals 12 are separated from and facing each other across gaps 92 with the contact pressure applying component 18 held at the first position. That is, with the contact pressure applying component 18 held at the first position, the respective terminals 14 and the respective mating terminals 12 are not electrically connected.

Figure 8:
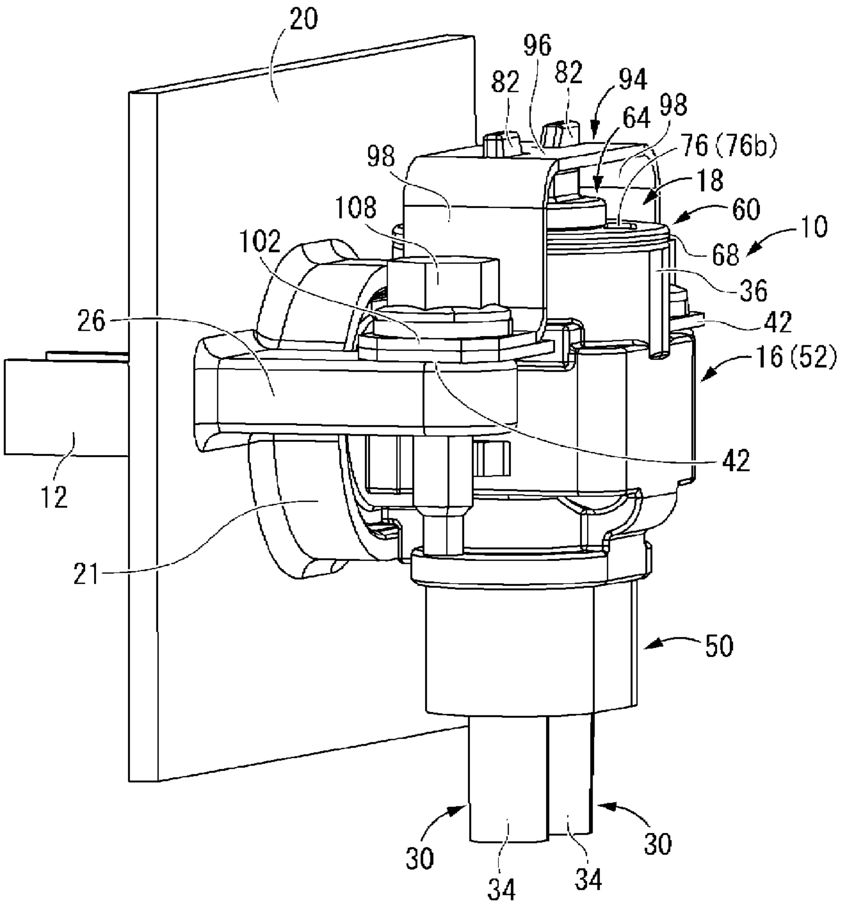
FIG. 8 is an overall perspective view of the connector shown in FIG. 1 showing a state where the contact pressure applying component is held at a second position.
Figure 9:
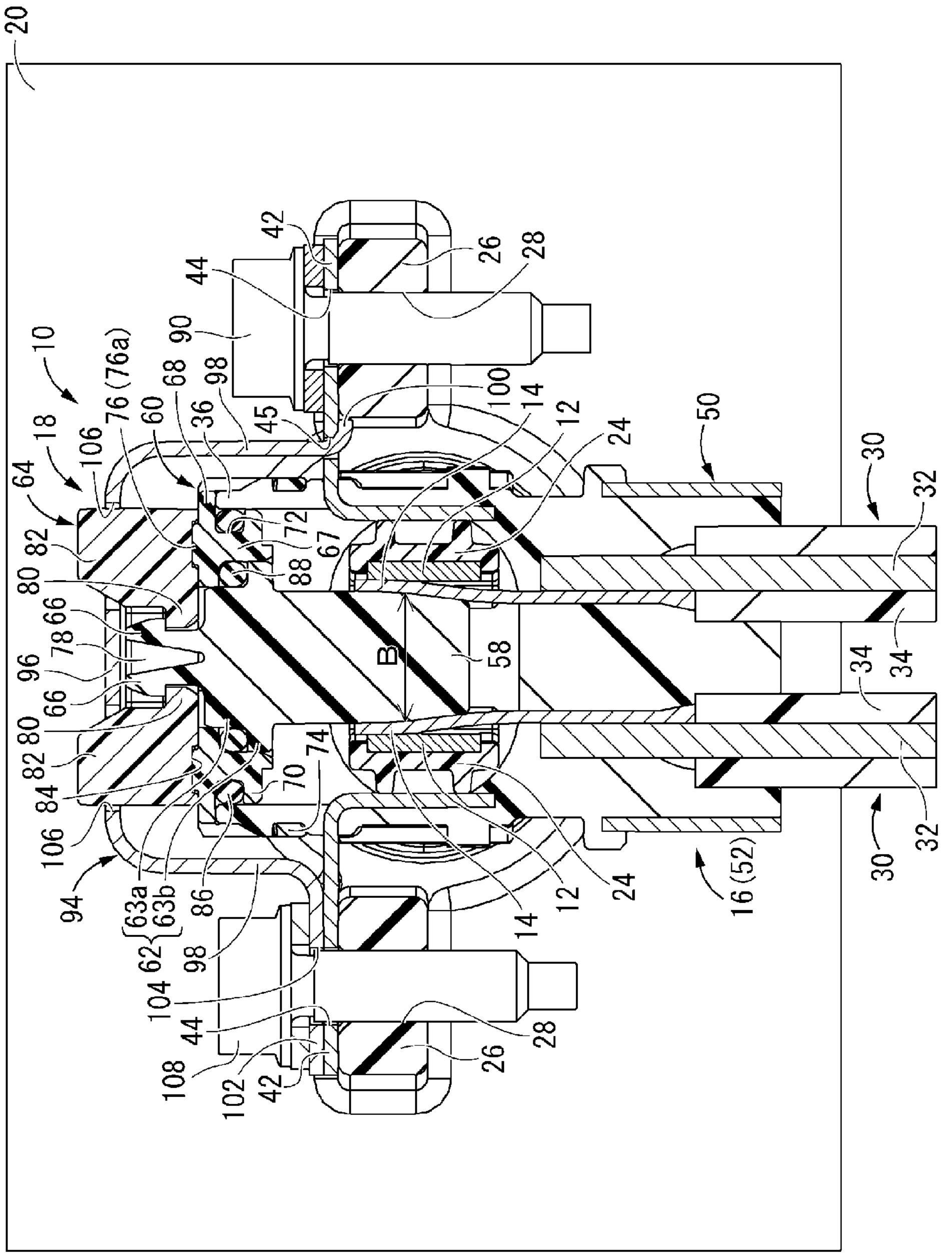
FIG. 9 is a vertical section, corresponding to FIG. 3, of the connector shown in FIG. 8.
Figure 10:
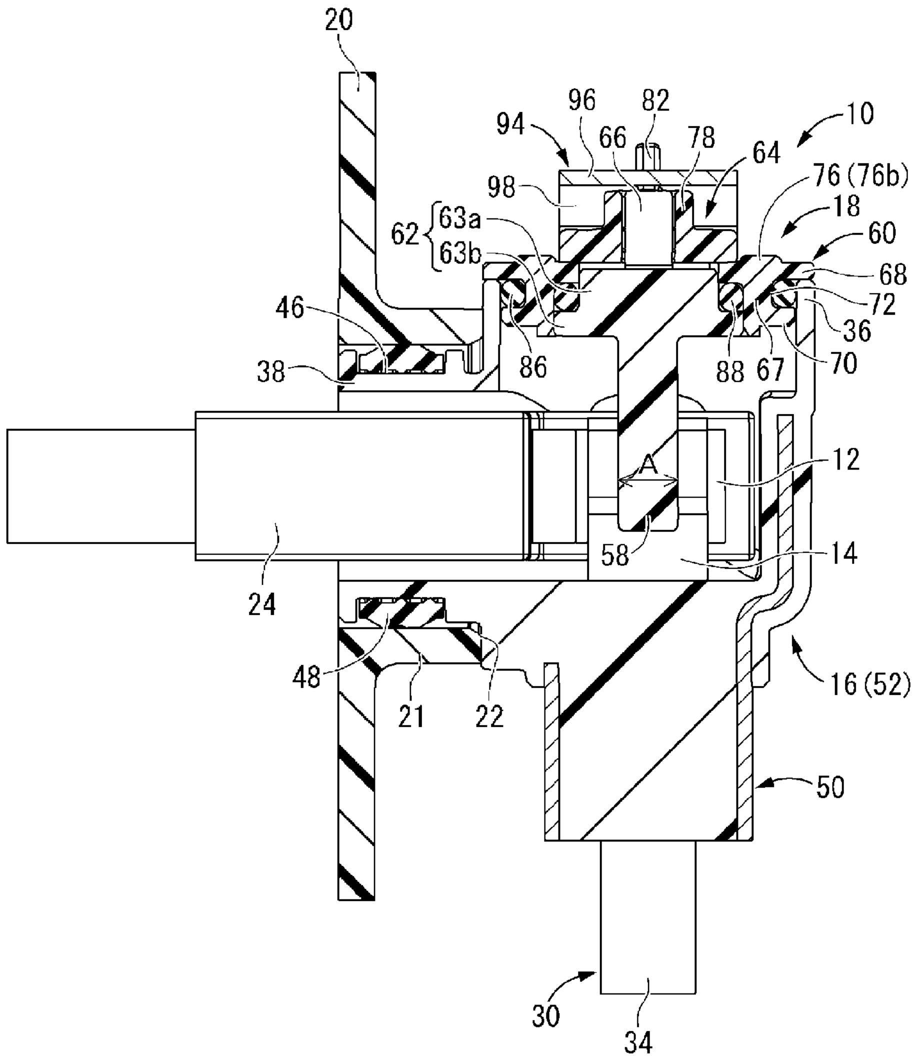
FIG. 10 is another vertical section, corresponding to FIG. 4, of the connector shown in FIG. 8.
Figure 11:
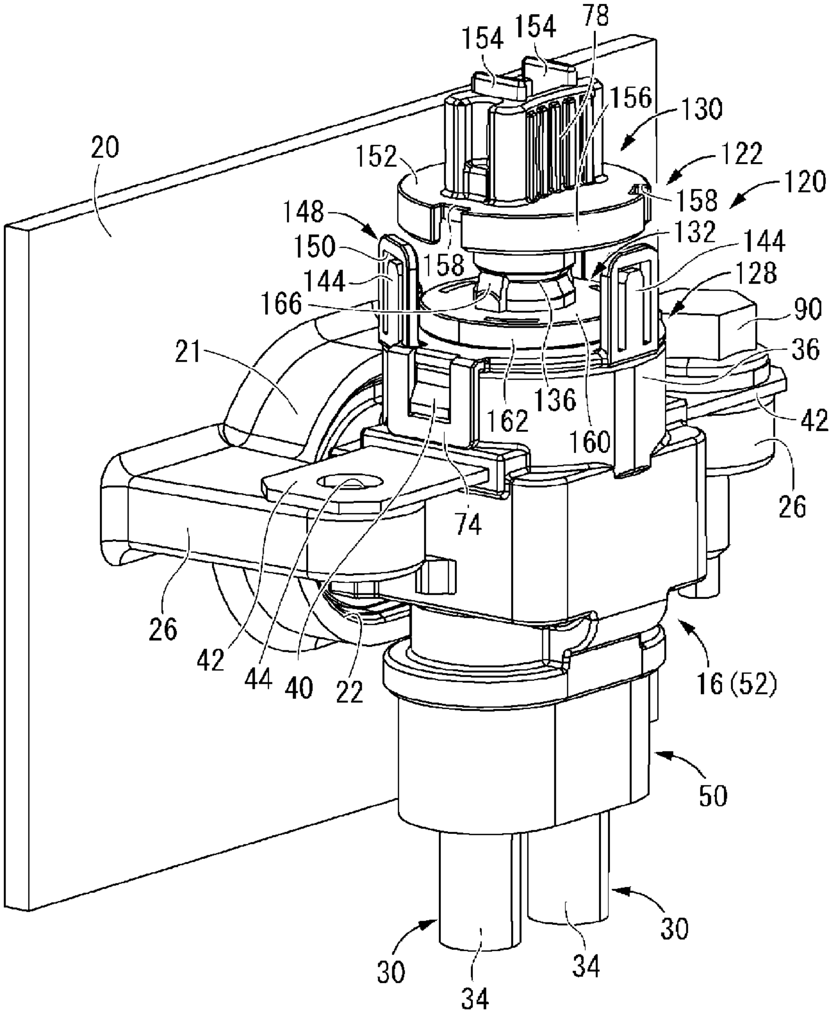
FIG. 11 is an overall perspective view of a connector according to a second embodiment showing a state where a contact pressure applying component is held at a first position.
Figure 12:
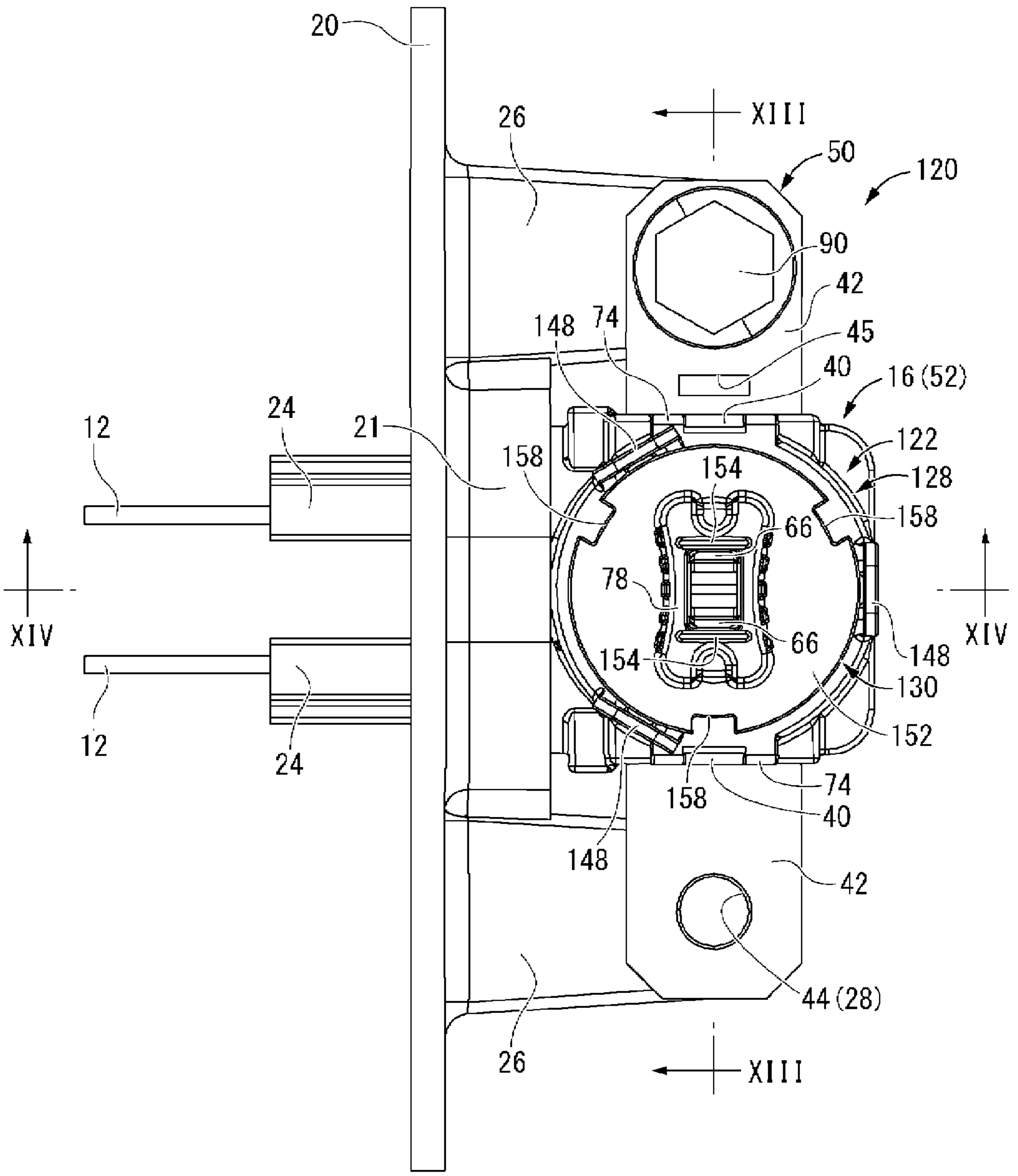
FIG. 12 is a plan view of the connector shown in FIG. 11.

A method for electrically connecting the respective terminals 14 and the respective mating terminals 12 by switching the contact pressure applying component 18 from the first position to the second position is described below with reference to FIGS. 8 to 10. That is, the pressing protrusion 58 in the contact pressure applying component 18 is rotated by 90° about the center axis serving as the axis of rotation from the first position, whereby the facing direction (lateral direction and first direction) of the pair of terminals 14, 14 and the large width direction B of the pressing protrusion 58 are set to the same direction. The dimension in the large width direction B of the pressing protrusion 58 is larger than the distance L between the facing surfaces of the pair of terminals 14, 14. Thus, by setting the facing direction of the pair of terminals 14, 14 and the large width direction B of the pressing protrusion 58 to the same direction, the pressing protrusion 58 contacts each terminal 14 from an inner side in the facing direction and pushes and expands each terminal 14 outward. In this way, with the contact pressure applying component 18 located at the second position, the pressing protrusion 58 presses each terminal 14 toward the mating terminal 12 inserted in the mating terminal insertion region 54. In this way, the respective terminals 14 and the respective mating terminals 12 are brought into contact with each other and electrically connected. That is, the contact pressure applying component 18 can be switched to the first position facing the respective terminals 14 and the second position in contact with the respective terminals 14 by rotating the pressing protrusion 58 by a predetermined angle (90° in this embodiment) about the axis of rotation.

The contact pressure applying component 18 switched from the first position to the second position by rotating the pressing protrusion 58 about the axis of rotation can be held at the second position. That is, by rotating the pressing protrusion 58 about the axis of rotation, the respective lock protrusions **76*b* on the both sides in the front-rear direction provided on the engaging portion 60 are separated from the respective lock recesses 84 and, subsequently, the respective lock protrusions 76*a* on the both sides in the lateral direction are fit into the respective lock recesses 84. In this way, the contact pressure applying component 18 is prevented from unintentional rotation and held at the second position. Therefore, in this embodiment, a second lock portion for holding the contact pressure applying component 18 at the second position is configured to include the lock protrusions 76*a*, 76*a* located on the both sides in the lateral direction and the lock recesses 84, 84. Note that the respective locking claws 66 of the rotating base 62 integrally formed with the pressing protrusion 58 are locked to the inner peripheral protrusions 80 in the rotation lever 64. Therefore, by gripping and rotating the respective grip portions 82, the pressing protrusion 58, the rotating base 62 and the rotation lever 64 are integrally rotated with respect to the housing 16 and the engaging portion 60**.

Particularly, in this embodiment, with the contact pressure applying component 18 located at the second position, a bracket 94 is overlapped from above the contact pressure applying component 18 and fixed to the housing 16. The bracket 94 is provided with a ceiling plate portion 96 extending in a horizontal direction (direction orthogonal to the vertical direction) and a pair of leg-like portions 98, 98 projecting downward on both sides in the lateral direction of the ceiling plate portion 96. In one leg-like portion 98 (right one in this embodiment), an end part opposite to the ceiling plate portion 96 is a bent portion 100 bent outward in the lateral direction. In the other leg-like portion 98 (left one in this embodiment), an end part opposite to the ceiling plate portion 96 is a mounting piece 102 extending outward in the lateral direction. The mounting piece 102 is formed with a bolt insertion hole 104. Further, the ceiling plate portion 96 is formed with a pair of through holes 106, 106 enabling the insertion of upper end parts of the respective grip portions 82 and separated from each other in the lateral direction.

This bracket 94 is overlapped from above the contact pressure applying component 18, and the upper end parts of the respective grip portions 82 are inserted into the respective through holes 106. Further, the bent portion 100, which is one end part of the bracket 94, is inserted into the through hole 45 provided in one mounting plate portion 42 (right one in this embodiment) and locked. Further, the mounting piece 102, which is the other end part of the bracket 94, is overlapped on the other mounting plate portion 42 and the leg portion 26 (respectively left ones in this embodiment) and fastened by a bolt 108 inserted through the respective bolt insertion holes 28, 44 and 104. In this way, the bracket 94 is immovably fixed to the housing 16, and unintentional rotation of the contact pressure applying component 18 with respect to the housing 16 is prevented also by the contact of the inner surfaces of the respective through holes 106 in the bracket 94 and the respective grip portions 82. That is, in this embodiment, the second lock portion for holding the contact pressure applying component 18 at the second position is also constituted by the bracket 94 and the respective grip portions 82, 82 (rotation lever 64).

According to the connector 10 of this embodiment, with the contact pressure applying component 18 in the initial state located at the first position, the respective mating terminals 12 are facing the respective terminals 14 without contacting in inserting the respective mating terminals 12 into the connector 10. Thus, wear associated with the contact of the respective terminals 14 and the respective mating terminals 12 is avoided. By switching the contact pressure applying component 18 from the first position to the second position after the insertion of the respective mating terminals 12 into the connector 10, the respective terminals 14 are pressed toward the respective mating terminals 12. In this way, contact pressures between the respective terminals 14 and the respective mating terminals 12 can be improved and the respective terminals 14 and the respective mating terminals 12 can be stably electrically connected.

With the contact pressure applying component 18 located at the first position, the gaps 92 are present between the respective terminals 14 and the respective mating terminals 12 and these terminals are separated from each other. Thus, friction forces with the respective terminals 14 are not applied to the respective mating terminals 12 in inserting the respective mating terminals 12 into the connector 10. Thus, wear associated with the contact of the respective terminals 14 and the respective mating terminals 12 can be more reliably avoided. Particularly, since the respective mating terminals 12 can be inserted without substantially contacting other members, an insertion force for inserting the respective mating terminals 12 into the connector 10 can be reduced and mounting workability in mounting the connector 10 on the mounting portion 20 of the device is also improved.

The contact pressure applying component 18 can be switched to the first position and the second position by rotating the pressing protrusion 58 about the center axis serving as the axis of rotation. In this way, the contact pressure applying component 18 can be switched to the first position and the second position, i.e. the respective terminals 14 and the respective mating terminals 12 can be electrically connected and disconnected, by a simple operation, whereby operability can be improved. Further, since the pressing protrusion 58 is accommodated into the pressing protrusion accommodation region 56 between the facing surfaces of the pair of terminals 14, 14 and switchably brought into contact with and separated from the respective terminals 14 from inside in the facing direction, a large space is not necessary and the connector 10 can be reduced in size.

The contact pressure applying component 18 includes the engaging portion 60 to be fixedly assembled with the open tube portion 36 of the housing 16. In this way, with the contact pressure applying component 18 located at the second position, reaction forces associated with the pressing protrusion 58 pushing and expanding the respective terminals 14 outward and resilient restoring forces of the respective terminals 14 are distributed and applied not only to the pressing protrusion 58, but also to the housing 16 and the like via the engaging portion 60. As a result, it can be prevented that the pressing protrusion 58 unintentionally rotates in an opposite direction and the contact pressure applying component 18 returns from the second position to the first position. Further, in assembling the contact pressure applying component 18 and assembling the contact pressure applying component 18 with the integrally molded article 52 (housing 16), the first sealing ring 86 is arranged between the open tube portion 36 of the housing 16 and the engaging portion 60 and the second sealing ring 88 is arranged between the engaging portion 60 and the rotating base 62. In this way, the gaps between the respective members are sealed in a liquid-tight manner and the waterproofness of the connector 10 can be improved. Particularly, both the first and second sealing rings 86, 88 have an annular shape. Therefore, waterproofness is ensured over the entire circumference in the circumferential direction and, even if the pressing protrusion 58 and the rotating base 62 rotate with respect to the housing 16 and the engaging portion 60 as in this embodiment, it is avoided that waterproofness is impaired.

The pressing protrusion 58 is integrally formed to the rotating base 62, and the respective locking claws 66 projecting from the rotating base 62 are locked to the inner peripheral protrusions 80 in the rotation lever 64. In this way, the pressing protrusion 58, the rotating base 62 and the rotation lever 64 can integrally rotate about the axis of rotation. Particularly, since the rotation lever 64 includes the respective grip portions 82 projecting outward, an operation of gripping the respective grip portions 82 from outside and rotating the rotation lever 64 and the pressing protrusion 58 can be easily performed.

The connector 10 is provided with the first lock portion for holding the contact pressure applying component 18 at the first position and the second lock portion for holding the contact pressure applying component 18 at the second position. In this way, the contact pressure applying component 18 is prevented from being unintentionally switched to the first position and the second position. That is, it can be prevented that the contact pressure applying component 18 is unintentionally at the second position and the terminals 14 and the mating terminals 12 strongly contact each other to be worn at the time of inserting the mating terminals 12 into the connector 10, and the contact pressure applying component 18 is unintentionally displaced to the first position and the terminals 14 and the mating terminals 12 are electrically disconnected at the time of energization. Particularly, the respective lock protrusions **76*a*, 76*b* and the lock recesses 84 are releasably engaged, and a rotational displacement of the contact pressure applying component 18 from the first position to the second position can be relatively easily made. In contrast, since the bracket 94 is fixed to the housing 16 by the bolt 108, the contact pressure applying component 18** can be more reliably held at the second position by the second lock portion.

Second Embodiment

Hereinafter, a connector 120 of a second embodiment of the present disclosure is described using FIGS. 11 to 18. A basic structure of the connector 120 of the second embodiment is similar to that of the connector 10 of the first embodiment, but the connector 120 of the second embodiment differs from the connector 10 of the first embodiment in the structure of a contact pressure applying component 122. In the following description, the contact pressure applying component 122 is mainly described, and substantially the same members and parts as those in the first embodiment are not described in detail by being denoted in figures by the same reference signs as those of the first embodiment.

<Contact Pressure Applying Component 122>

The contact pressure applying component 122 of the second embodiment includes a pressing protrusion 124 to be accommodated into a pressing protrusion accommodation region 56 between a pair of terminals 14, 14, a rotating base 126 integrally formed to the pressing protrusion 122 and an engaging portion 128 to be engaged with an open tube portion 36 of a housing 16. Further, the contact pressure applying component 122 is provided with a rotation lever 130 including inner peripheral protrusions 80 to be locked by locking claws 66 of the rotating base 126, and a holding member 132 arranged between the engaging portion 128 and the rotation lever 130.

The pressing protrusion 124 of the second embodiment has a substantially cylindrical shape and a substantially true circular cross-section. An outer diameter of the pressing protrusion 124 is gradually reduced toward a lower side. In the second embodiment, the outer diameter at the lower end of the pressing protrusion 124 is substantially equal to or slightly larger than a distance L between facing surfaces of the pair of terminals 14, 14. The pressing protrusion 124 is integrally formed with a substantially cylindrical rotating base 126 projecting upward. The rotating base 126 has a smaller diameter than the pressing protrusion 124, and an annular step portion 124 is formed at a boundary part between the pressing protrusion 124 and the rotating base 126. Further, a recessed portion 136 open toward an outer peripheral side over an entire circumference in a circumferential direction is formed in an intermediate part in the vertical direction on the outer peripheral surface of the rotating base 126. In short, the outer diameter of the rotating base 126 is partially reduced in the recessed portion 136. In the second embodiment, the upper and lower surfaces of the recessed portion 136 are both tapered surfaces extending toward the outer peripheral side toward an outer side in the vertical direction. A pair of locking claws 66, 66 project upward from an upper end part of the rotating base 126.

The engaging portion 128 has a substantially tubular shape as a whole as in the first embodiment and includes a peripheral wall 67, an upper annular portion 68 and a lower annular portion 70. A ring-shaped inner annular portion 138 projecting toward an inner peripheral side is provided in an intermediate part in the vertical direction of the peripheral wall 67, and a substantially cylindrical tubular wall portion 140 projecting upward is provided on an inner peripheral edge part of the upper annular portion 68. Outer peripheral claw portions 142 projecting toward the outer peripheral side are partially provided on a circumference on an upper end part of the tubular wall portion 140. In this embodiment, three outer peripheral claw portions 142 are provided substantially at equal intervals while being separated from each other in the circumferential direction.

Engaging frame bodies 74, 74 are provided to project downward from both sides in the lateral direction of an outer peripheral edge part of the upper annular portion 68 as in the first embodiment. Further, resilient pieces 144 projecting upward are provided at positions deviated from the respective engaging frame bodies 74 in the circumferential direction on the outer peripheral edge part of the upper annular portion 68, and claw portions 146 projecting toward the inner peripheral side are provided on upper ends, which are projecting tips, of the resilient pieces 144. This resilient piece 144 is formed by providing a slit 150 penetrating through a substantially rectangular base plate portion 148 in a plate thickness direction (radial direction of the engaging portion 128). The slit 150 is continuously formed over an upper side and both sides in the circumferential direction of the resilient piece 144. In this way, the resilient piece 144 is connected to the outer peripheral end part of the upper annular portion 68 at a lower end part, which is a projection base end, and resiliently deformable in the plate thickness direction (radial direction of the engaging portion 128). The resilient pieces 144 are partially provided on the circumference and, in this embodiment, three resilient pieces 144 are provided substantially at equal intervals while being separated from each other in the circumferential direction. Further, the upper surface of the claw portion 146 is a tapered surface extending downward toward the inner peripheral side.

Figure 13:
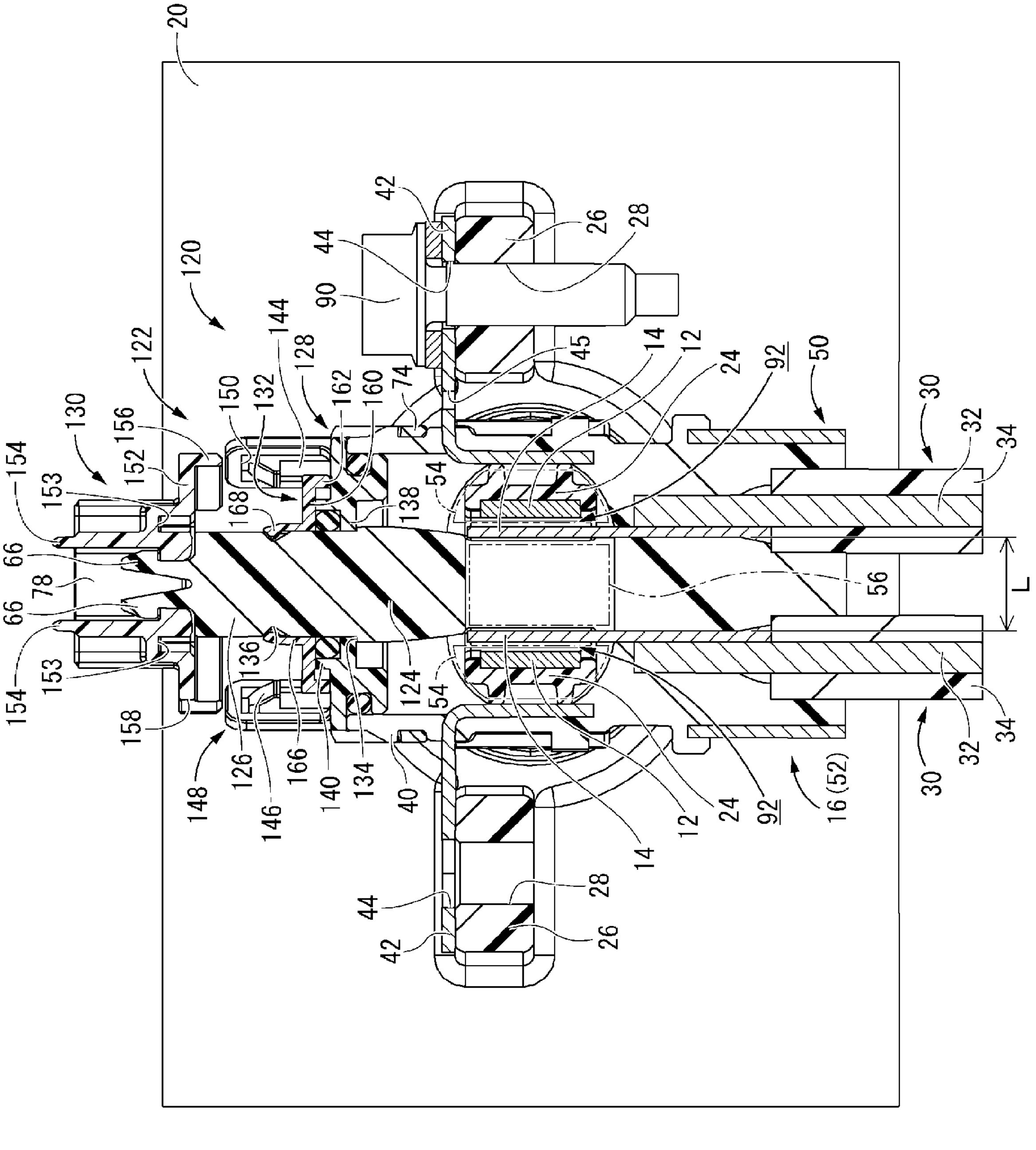
FIG. 13 is a section along XIII-XIII in FIG. 12.

The rotation lever 130 is provided with a substantially ring-shaped annular wall portion 152 extending in a horizontal direction (direction orthogonal to the vertical direction), and a tubular portion 78 projecting upward is provided on an inner peripheral end part of the annular wall portion 152. In an initial state (state where the contact pressure applying component 122 is at the first position) shown in FIGS. 11 to 15, inner peripheral protrusions 80, 80 projecting toward the inner peripheral side are provided on both sides in the lateral direction on the inner peripheral surface of the tubular portion 78. Further, as also shown in FIG. 13, accommodation recesses 153 open downward are formed on outer peripheral sides of the respective inner peripheral protrusions 80 in the lower surface of the rotation lever 130. Note that, in this embodiment, irregularities are formed on the outer peripheral surface of the tubular portion 78 so that the tubular portion 78 hardly slips when being pinched with fingers, and the tubular portion 78 exhibits a function as a grip. Further, in the initial state, a pair of inserting pieces 154, 154 projecting upward are provided on both sides in the lateral direction of the tubular portion 78.

Further, a peripheral wall portion 156 projecting downward is provided on the outer peripheral end part of the annular wall portion 152. The peripheral wall portion 156 is formed substantially over an entire circumference in the circumferential direction and partially provided with cut portions 158 on the circumference. In this embodiment, the cut portions 158 are provided at three positions on the circumference. These cut portions 158 are formed substantially at equal intervals while being separated from each other in the circumferential direction. That is, the peripheral wall portion 156 is not formed in formation regions of these cut portions 158, and is divided in the circumferential direction. A circumferential dimension of the cut portion 158 is substantially equal to or slightly larger than that of the claw portion 146 provided on the resilient piece 144. These cut portions 158, peripheral wall portion 156 and the claw portions 146 are formed substantially at the same position in a radial direction of the contact pressure applying component 122. Further, in the initial state shown in FIGS. 11 to 15, the respective cut portions 158 and the respective claw portions 146 are at positions shifted in the circumferential direction.

Figure 14:
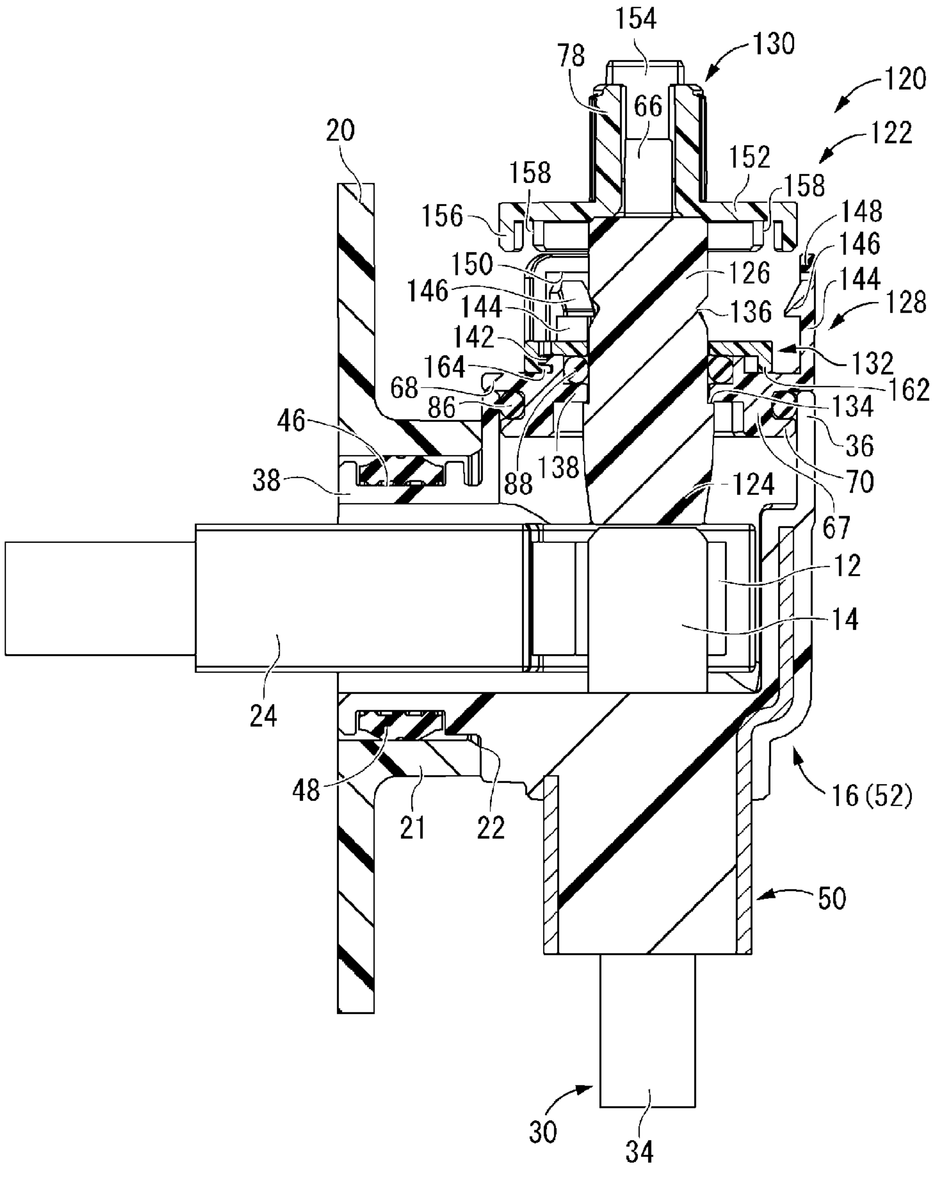
FIG. 14 is a section along XIV-XIV in FIG. 12.
Figure 15:
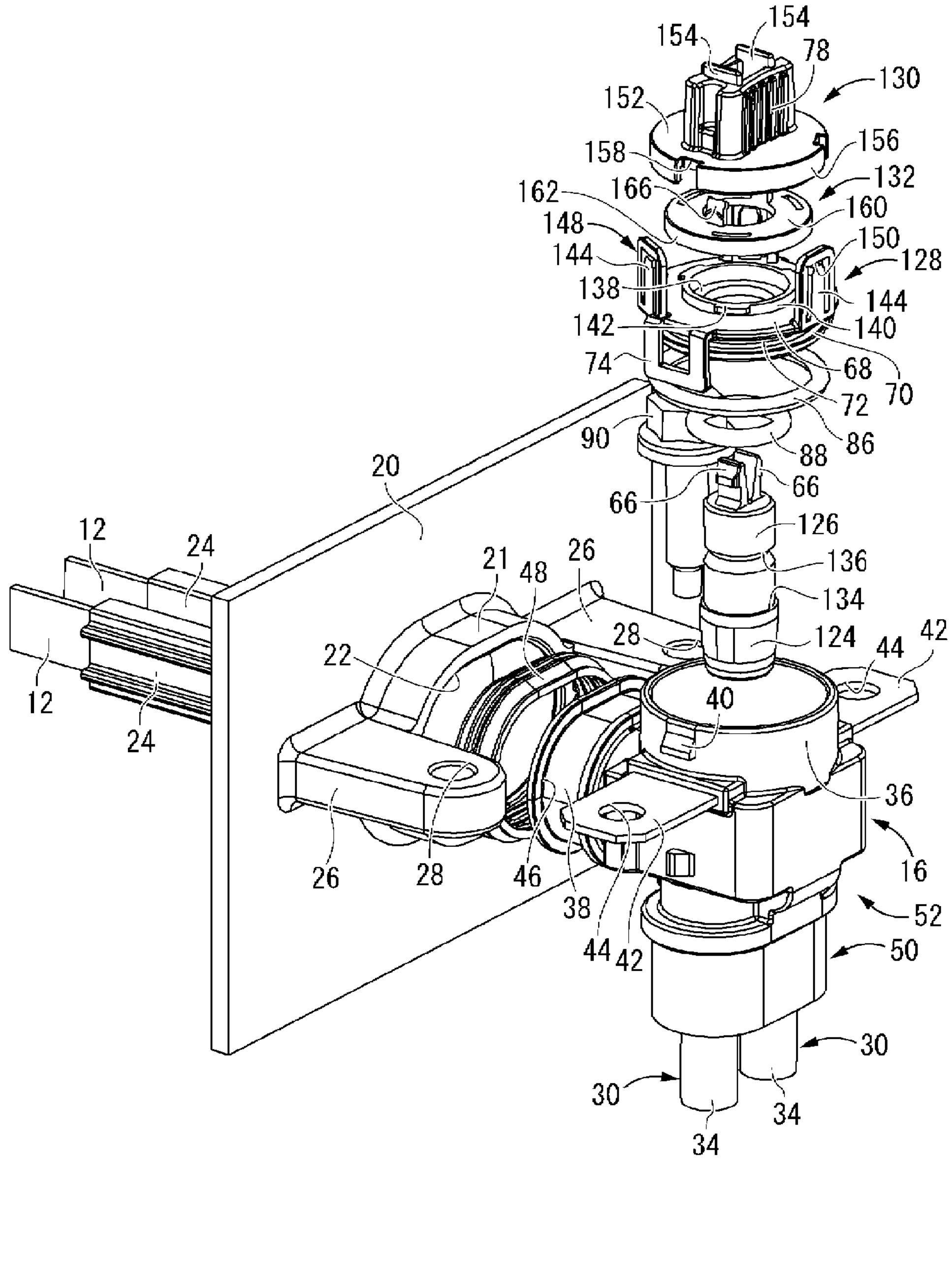
FIG. 15 is an exploded perspective view of the connector shown in FIG. 11.

The holding member 132 is provided with a circular ring portion 160 annularly extending in a horizontal direction, and a vertical tube portion 162 projecting downward is provided on an outer peripheral end part of the circular ring portion 160. As also shown in FIG. 14, inner peripheral claw portions 164 projecting toward an inner peripheral side are provided on a lower end part of the vertical tube portion 162. The inner peripheral claw portions 164 are partially provided on a circumference and, in this embodiment, three inner peripheral claw portions 164 are provided substantially at equal intervals while being separated from each other in the circumferential direction. Each inner peripheral claw portion 164 can be, for example, formed to have a circumferential dimension substantially equal to that of the outer peripheral claw portion 142 in the engaging portion 128.

Further, holding projections 166 projecting upward are provided on an inner peripheral end part of the holding member 132. These holding projections 166 are formed to be relatively thin and resiliently deformable in a plate thickness direction (radial direction of the holding member 132). The holding projection 166 includes a claw-like part

168 projecting toward an inner peripheral side on an upper end part, which is a projecting tip. In this embodiment, a pair of the holding projections 166, 166 are provided and facing each other in the lateral direction.

By assembling these pressing protrusion 124, rotating base 126, engaging portion 128, rotation lever 130 and holding member 132, the contact pressure applying component 122 of the second embodiment is configured. That is, the engaging portion 128 is assembled from above the pressing protrusion 124 and the rotating base 126, and the inner peripheral end part of the inner annular portion 138 of the engaging portion 128 comes into contact with the step portion 134 provided at the boundary part between the pressing protrusion 124 and the rotating base 126. In other words, the rotating base 126 is inserted into an inner hole of the engaging portion 128. A second sealing ring 88 is arranged in an annular space constituted by the rotating base 126 and the inner annular portion 138 and the tubular wall portion 140 of the engaging portion 128.

The holding member 132 is assembled from above this engaging portion 128, the rotating base 126 is inserted into an inner hole of the holding member 132, and the outer peripheral claw portions 142 of the engaging portion 128 and the inner peripheral claw portions 164 of the holding member 132 are engaged with each other in the vertical direction. The outer peripheral claw portions 142 and the inner peripheral claw portions 164 are engaged in the vertical direction, for example, by overlapping the engaging portion 128 and the holding member 132 with the outer peripheral claw portions 142 and the inner peripheral claw portions 164 shifted from each other in the circumferential direction. Thereafter, the engaging portion 128 and the holding member 132 are relatively rotated about a center axis to position the outer peripheral claw portions 142 and the inner peripheral claw portions 164 in the circumferential direction and overlap these in the vertical direction, whereby the above engagement in the vertical direction is realized. With the holding member 132 externally fit to the rotating base 126 in this way, the claw-like parts 168 of the respective holding projections 166 are fit into and engaged with the recessed portion 136 provided in the outer peripheral surface of the rotating base 126. In this way, unintentional position shifts of the rotating base 126, the pressing protrusion 124 and the holding member 132 in the vertical direction are prevented.

Then, the locking claws 66, 66 in the rotating base 126 are inserted into the tubular portion 78 of the rotation lever 130 from below and locked to the inner peripheral protrusions 80, 80, whereby the rotation lever 130 is assembled with the rotating base 126. In this way, the pressing protrusion 124, the rotating base 126 and the rotation lever 130 are integrally displaceable in the vertical direction and integrally rotatable about an axis of rotation with respect to the housing 16 and the engaging portion 128.

The contact pressure applying component 122 assembled as described above is inserted through the upper opening of the open tube portion 36 in the housing 16 and the engaging frame bodies 74 are engaged with the engaging protrusions 40 of the housing 16, whereby the connector 120 of the second embodiment is configured. In this connector 120, the engaging portion 128 and the holding member 132 are fixedly assembled with the housing 16 in the vertical direction. Further, as described above, the pressing protrusion 124, the rotating base 126 and the rotation lever 130 are integrally displaceable in the vertical direction and rotationally displaceable with respect to the housing 16, the engaging portion 128 and the holding member 132.

In the connector 120 of the second embodiment, the claw-like parts 168 on the respective holding projections 166 are fit in the recessed portion 136 of the rotating base 126 in the initial state (state where the contact pressure applying component 122 is at the first position) shown in FIGS. 11 to 15. In this way, the rotating base 126 and the pressing protrusion 124 are positioned in the vertical direction with respect to the holding member 132 and, consequently, the housing 16, and the lower end position of the pressing protrusion 124 in the initial state is specified. Therefore, in the second embodiment, a first lock portion for holding the contact pressure applying component 122 at the first position is configured to include the holding member 132 and the rotating base 126, particularly constituted by the claw-like parts 168 of the respective holding projections 166 and the recessed portion 136 of the rotating base 126. Further, in the initial state, the claw portions 146 of the respective resilient pieces 136 in the engaging portion 128 and the respective cut portions 158 in the rotation lever 130 are at positions shifted in the circumferential direction, in other words, the claw portions 146 of the respective resilient pieces 144 and the peripheral wall portion 156 of the rotation lever 130 are facing each other in the vertical direction.

In the second embodiment, in the initial state, the pressing protrusion 124 is located above the pressing protrusion accommodation region 56 between the pair of terminals 14, 14, i.e. the pressing protrusion 124 is arranged at a position deviated from the pressing protrusion accommodation region 56 in the second direction at the first position. In this way, with the contact pressure applying component 122 located at the first position, the respective terminals 14 are facing the respective mating terminals 12 across gaps 92 in the first direction.

Figure 16:
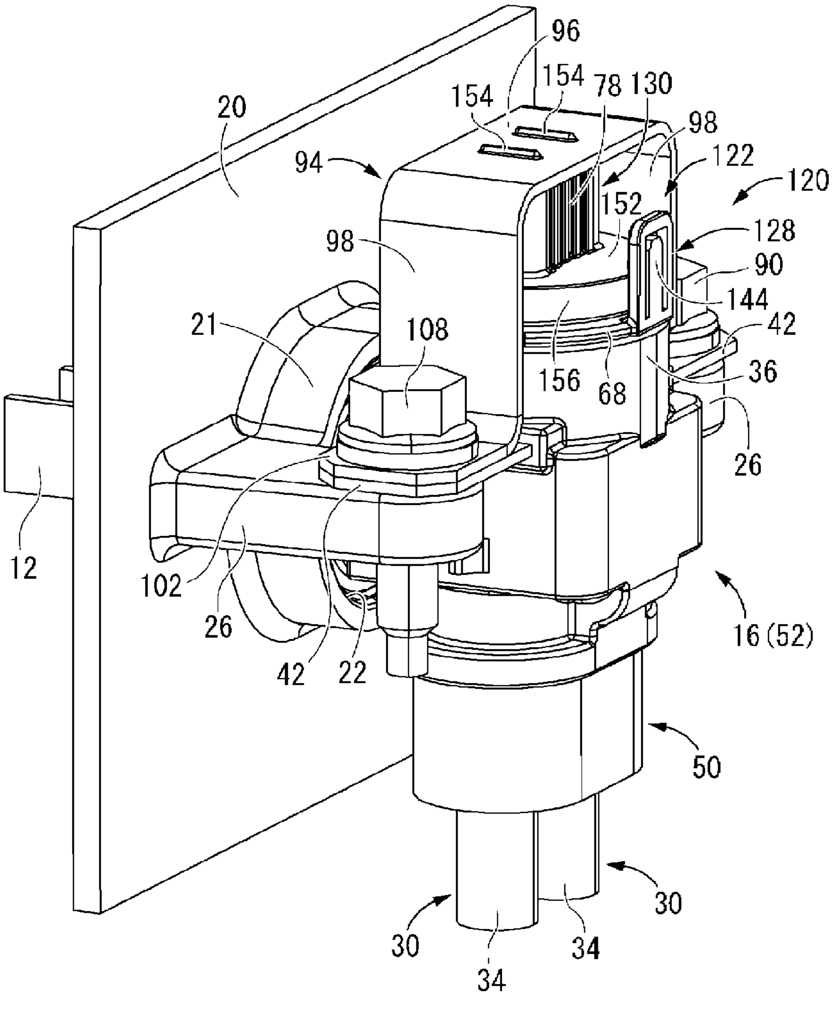
FIG. 16 is an overall perspective view of the connector shown in FIG. 11 showing a state where the contact pressure applying component is held at a second position.
Figure 17:
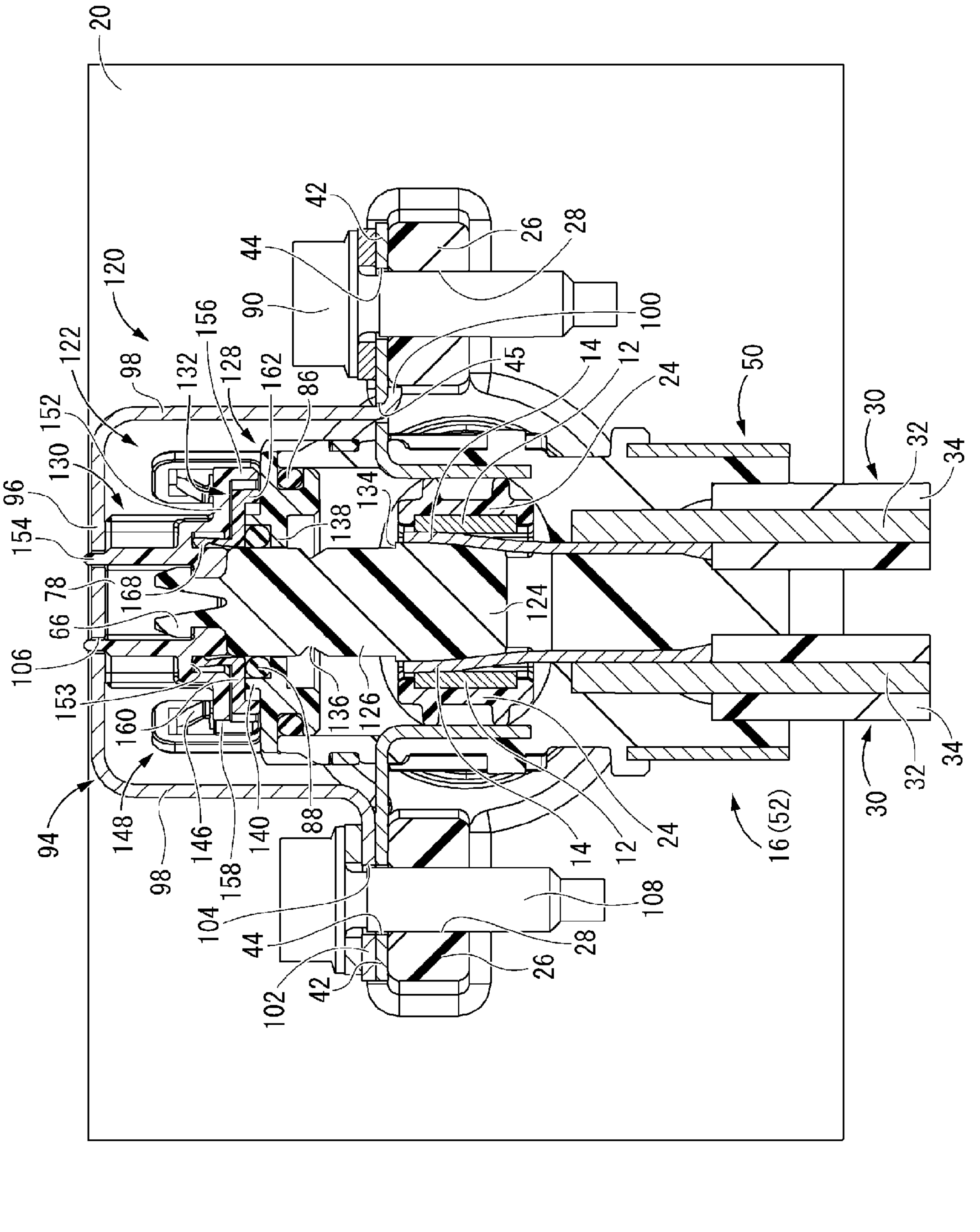
FIG. 17 is a vertical section, corresponding to FIG. 13, of the connector shown in FIG. 16.
Figure 18:
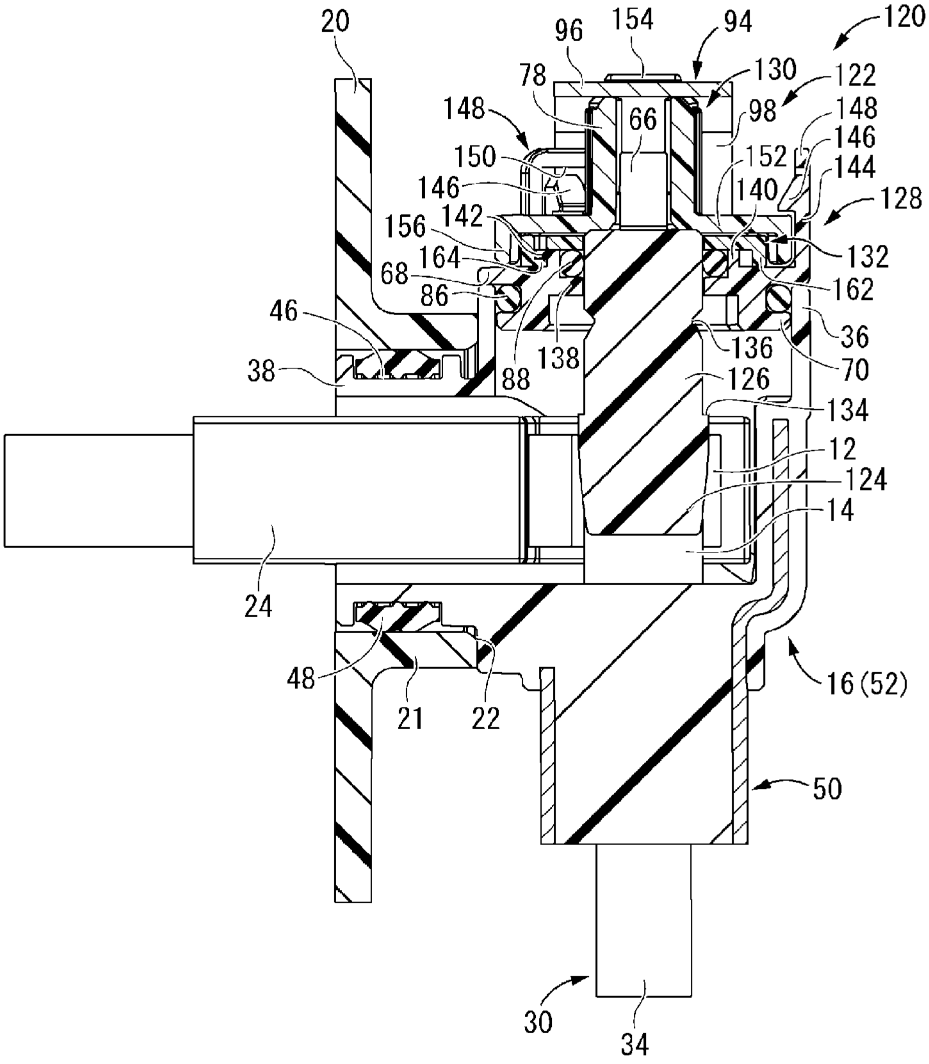
FIG. 18 is another vertical section, corresponding to FIG. 14, of the connector shown in FIG. 16.

To switch this contact pressure applying component 122 from the first position to the second position, the pressing protrusion 124, the rotating base 126 and the rotation lever 130 in the contact pressure applying component 122 are pushed downward (second direction) with respect to the housing 16. In this way, as shown in FIGS. 16 to 18, the respective holding projections 166 are deflected toward the outer peripheral side along the inclination of the upper surface of the recessed portion 136, and the respective claw-like parts 168 and the recessed portion 136 are disengaged. As a result, downward displacements of the pressing protrusion 124 and the rotating base 126 are allowed, and the rotation lever 130 is displaced downward (second direction) with respect to the housing 16, together with the pressing protrusion 124 and the rotating base 126.

By moving downward, the pressing protrusion 124 is accommodated into the pressing protrusion accommodation region 56 from the position deviated from the pressing protrusion accommodation region 56 in the second direction. The outer diameter of the pressing protrusion 124 is set substantially equal to or larger than the distance L between the facing surfaces of the pair of terminals 14, 14. Thus, by accommodating the pressing protrusion 124 into the pressing protrusion accommodation region 56, the pressing protrusion 124 presses the respective terminals 14 outward from inside in the first direction (lateral direction) and the respective terminals 14 contact the respective mating terminals 12 by being pushed and expanded outward in the facing directions. That is, as shown in FIGS. 16 to 18, the contact pressure applying component 122 is located at the second position with the pressing protrusion 124 accommodated in the pressing protrusion accommodation region 56.

In switching the contact pressure applying component 122 from the first position to the second position, the peripheral wall portion 156 of the rotation lever 130 and the claw portions 146 of the respective resilient pieces 144 of the engaging portion 128 facing each other in the vertical direction come into contact according to a downward movement of the rotation lever 130. In this way, the respective resilient pieces 144 are resiliently deformed toward the outer peripheral side in accordance with the inclination of the upper surfaces of the respective claw portions 146. These claw portions 146 ride over the annular wall portion 152 of the rotation lever 130, whereby the respective resilient pieces 144 are resiliently restored and the respective claw portions 146 are locked to the annular wall portion 152. In this way, upward displacement of the pressing protrusion 124 and the rotation lever 130 moved downward are prevented. Further, the respective holding projections 166 deflected and deformed toward the outer peripheral side are accommodated into the respective accommodation recesses 153 in the rotation lever 130 and come into contact with the upper bottom surfaces of the respective accommodation recesses 153. Further, the lower end of the peripheral wall portion 156 in the rotation lever 130 comes into contact with the upper end surface of the upper annular portion 68 in the engaging portion 128. These prevent the pressing protrusion 124 and the rotation lever 130 from being further displaced downward. Therefore, in the second embodiment, a second lock portion for holding the contact pressure applying component 122 at the second position is configured to include these engaging portion 128, rotation lever 130 and holding member 132.

Note that, to return the contact pressure applying component 122 from the second position to the first position, the rotation lever 130 and the engaging portion 128 (housing 16) may be relatively rotated about the center axis and the claw portions 146 of the respective resilient pieces 144 and the respective cut portions 158 of the rotation lever 130 may be aligned with each other in the circumferential direction. In this way, locking between the respective claw portions 146 and the annular wall portion 152 is released and the rotation lever 130 and the pressing protrusion 124 are made displaceable upward with respect to the housing 16. In this state, the tubular portion 78 is gripped and the rotation lever 130 and the pressing protrusion 124 are pulled up to initial positions shown in FIGS. 11 to 15. In this way, the claw-like parts 168 of the respective holding projections 166 enter the recessed portion 136 of the rotating base 126. Then, by locating the respective claw portions 146 and the respective cut portions 158 at positions shifted in the circumferential direction by relatively rotating the rotation lever 130 and the engaging portion 128, the contact pressure applying component 122 returns to the first position.

Here, with the contact pressure applying component 122 located at the second position, a bracket 94 is assembled from above the rotation lever 130 and fixed by a bolt 108 as in the first embodiment. In the second embodiment, the rotation lever 130 is fixed with inserting pieces 154 provided on the rotating base 130 inserted in through holes 106 of the bracket 94 and a ceiling plate portion 96 of the bracket 94 overlapped on the upper surface of the tubular portion 78. In this way, the rotation lever 130 is prevented from being unintentionally rotationally displaced to displace the contact pressure applying component 122 from the second position to the first position by the mutual contact of the respective inserting pieces 154 and the inner surfaces of the respective through holes 106. Therefore, in the second embodiment, the second lock portion for holding the contact pressure applying component 122 at the second position is also constituted by the bracket 94 and the respective inserting pieces 154 (rotation lever 130).

Also in the connector 120 of the second embodiment, effects similar to those of the connector 10 of the first embodiment can be achieved. Particularly, in the second embodiment, the contact pressure applying component 122 can be switched from the first position to the second position by displacing the pressing protrusion 124 in the vertical direction, which is the second direction, unlike the first embodiment. Therefore, in the connector according to the present disclosure, a displacement of the pressing protrusion is not limited to a rotational displacement about the axis of rotation as in the first embodiment, but may be a displacement in the vertical direction as in the second embodiment.

Modifications

Although the first and second embodiments have been described in detail as specific examples of the present disclosure above, the present disclosure is not limited by this specific description. The present disclosure includes modifications, improvements and the like within a range in which the aim of the present disclosure can be accomplished. For example, the following modifications of the embodiments are also included in the technical scope of the present disclosure.

(1) Although the respective terminals 14, the respective mating terminals 12 and the pressing protrusion 58 are separated from and facing each other in the first direction (lateral direction) as shown in FIG. 3 with the contact pressure applying component 18 located at the first position in the above first embodiment, there is no limitation to this mode. That is, with the contact pressure applying component located at the first position, the respective terminals and the pressing protrusion may be in contact with and facing each other in the first direction or the pressing protrusion may press the respective terminals from inside in the lateral direction as long as the respective terminals pushed and expanded outward in the lateral direction do not strongly contact the respective mating terminals when the respective mating terminals are inserted into the connector. Further, although the respective mating terminals 12 are so inserted into the connector 10 as to form the gaps 92 between the respective terminals 14 and the respective mating terminals 12 in the first direction in the above first embodiment, the respective mating terminals may contact the respective terminals with a small contact pressure when being inserted into the connector. Even in this case, wear associated with contact with the respective terminals can be avoided when the respective mating terminals are inserted into the connector.

(2) As in (1) described above, with the contact pressure applying component located at the first position, the pressing protrusion may be inserted into the pressing protrusion accommodation region between the pair of terminals, and a part of the pressing protrusion accommodated into the pressing protrusion accommodation region between the pair of terminals may be separated from and facing the pair of terminals in the first direction or may be in contact with and facing the pair of terminals. Further, the pressing protrusion inserted into between the pair of terminals may press the pair of terminals outward in the lateral direction as long as the respective mating terminals do not contact the respective terminals with a large contact pressure when being inserted into the connector.

(3) Although the contact pressure applying component 18 is switched from the first position to the second position by a rotational displacement of the pressing protrusion 58 about the axis of rotation in the above first embodiment and the contact pressure applying component 122 is switched from the first position to the second position by pushing the pressing protrusion 124 downward in the second embodiment, a combination of these rotating operation and push-in operation may be, for example, adopted. That is, although the resilient pieces 144 including the claw portions 146 on the projecting tips and resiliently deformable in the plate thickness direction (radial direction) are provided in the second embodiment, resiliently undeformable locking claws may be adopted instead of such resiliently deformable resilient pieces and claw portions.

In this mode, in the initial state, claw portions of the locking claws and the cut portions of the rotation lever are located at positions shifted in the circumferential direction, i.e. the peripheral wall portion of the rotation lever and the claw portions are facing each other in the vertical direction, and a downward displacement of the rotation lever is hindered by the contact of these peripheral wall portion and claw portions in the vertical direction. To displace the contact pressure applying component from the first position to the second position, the rotation lever and the engaging portion are relatively rotated by a predetermined angle about the center axis to align the claw portions and the cut portions in the circumferential direction. In this way, the claw portions can move in the cut portions in the vertical direction to allow downward displacements of the rotation lever and the pressing protrusion. With the contact pressure applying component located at the second position by pushing the rotation lever and the pressing protrusion downward, the rotation lever and the engaging portion are relatively rotated by a predetermined angle in a direction opposite to the previous direction. Since the circumferential positions of the claw portions and the cut portions are shifted in this way, the claw portions can be locked to the annular wall portion of the rotation lever. As a result, the contact pressure applying component is held at the second position.

According to this mode, since a downward movement of the rotation lever is hindered to hold the contact pressure applying component at the first position by the contact of the peripheral wall portion of the rotation lever and the claw portions in the vertical direction, the holding member 132 in the second embodiment is not necessary. Further, since the locking claws need not be resiliently deformed, the base plate portions 148 in the second embodiment are also not necessary. In this way, the structure of the connector can be simplified. Further, since the rotating operation and the push-in operation of the pressing protrusion are both necessary in switching the contact pressure applying component from the first position to the second position, an unintended switch of the contact pressure applying component from the first position to the second position is more reliably prevented.

LIST OF REFERENCE NUMERALS

10 connector (first embodiment)
12 mating terminal
14 terminal
16 housing
18 contact pressure applying component
20 mounting portion
21 mounting tube portion
22 opening
24 resin member
26 leg portion
28 bolt insertion hole
30 wire
32 core wire
34 insulation coating
36 open tube portion
38 inserting tube portion
40 engaging protrusion
42 mounting plate portion
44 bolt insertion hole
45 through hole
46 recessed groove
48 water stop member
50 metal member
52 integrally molded article
54 mating terminal insertion region
56 pressing protrusion accommodation region
58 pressing protrusion
60 engaging portion
62 rotating base
**63*a*** small-diameter portion
**63*b*** large-diameter portion
64 rotation lever (second lock portion)
66 locking claw
67 peripheral wall
68 upper annular portion
70 lower annular portion
72 peripheral groove
74 engaging frame body
76 lock protrusion
**76*a*** lock protrusion (second lock portion)
**76*b*** lock protrusion (first lock portion)
78 tubular portion
80 inner peripheral protrusion
82 grip portion
84 lock recess (first lock portion, second lock portion)
86 first sealing ring
88 second sealing ring
90 bolt
92 gap
94 bracket (second lock portion)
96 ceiling plate portion
98 leg-like portion
100 bent portion
102 mounting piece
104 bolt insertion hole
106 through hole
108 bolt
120 connector (second embodiment)
122 contact pressure applying component
124 pressing protrusion
126 rotating base (first lock portion)
128 engaging portion (second lock portion)
130 rotation lever (second lock portion)
132 holding member (first lock portion, second lock portion)
134 step portion
136 recessed portion
138 inner annular portion
140 tubular wall portion
142 outer peripheral claw portion
144 resilient piece
146 claw portion

148 base plate portion
150 slit
152 annular wall portion
153 accommodation recess
154 inserting piece
156 peripheral wall portion
158 cut portion
160 circular ring portion
162 vertical tube portion
164 inner peripheral claw portion
166 holding projection
168 claw-like part
A small width direction
B large width direction
L distance between facing surface of pair of terminals

What is claimed is:

1. A connector, comprising:

a housing having a pair of mating terminal insertion regions arranged in parallel, and a pressing protrusion accommodation region arranged between the pair of mating terminal insertion regions in a first direction;

a pair of terminals accommodated in the housing and respectively arranged between the pressing protrusion accommodation region and one of the pair of mating terminal insertion regions in the first direction; and a contact pressure applying component configured to be accommodated in the housing, the contact pressure applying component including a pressing protrusion projecting in a second direction intersecting the insertion direction and the first direction and being holdable at a first position and a second position, the pressing protrusion configured to be accommodated in the pressing protrusion accommodation region and to be moved in the second direction, the pressing protrusion being movable with respect to the housing according to whether the contact pressure applying component is held at the first position or the second position, a mating terminal being insertable into the pair of mating terminal insertion regions in an insertion direction intersecting the first direction, the mating terminal insertable with the contact pressure applying component held at the first position, and the contact pressure applying component contacting the pair of terminals and pressing each of the pair of terminals toward the mating terminal inserted into the pair of mating terminal insertion regions with the contact pressure applying component held at the second position.

2. The connector of claim 1, wherein the pair of terminals are separated from the mating terminal with the contact pressure applying component held at the first position.

3. The connector of claim 1, wherein:

the pressing protrusion is further configured to be rotatable about an axis of rotation along the second direction with respect to the housing, the pressing protrusion extends in a large width direction and a small width direction, the pressing protrusion having a large radial dimension orthogonal to the axis of rotation along the large width direction and a smaller radial dimension along the small width direction than along the large width direction, the contact pressure applying component is switchable to the first position and the second position by rotation of the pressing protrusion about the axis of rotation, the pressing protrusion faces the pair of terminals in the small width direction in the first direction when the contact pressure applying component is at the first position, and the pressing protrusion contacts the pair of terminals in the large width direction in the first direction to press each of the pair of terminals toward the mating terminal when the contact pressure applying component is at the second position.

4. The connector of claim 1, wherein:

the housing includes an open tube portion open to expose the pressing protrusion accommodation region to outside in the second direction, the contact pressure applying component further includes an engaging portion to be engaged with the open tube portion of the housing, and a rotating base holding the pressing protrusion and being held on the engaging portion rotatably about an axis of rotation, and the connector further comprises:

an annular first sealing ring to be arranged between and pressed in contact with facing surfaces of the open tube portion and the engaging portion, and an annular second sealing ring to be arranged between and pressed in contact with facing surfaces of the rotating base and the engaging portion.

5. The connector of claim 4, wherein the contact pressure applying component further includes a rotation lever projecting on a surface of the engaging portion, the rotation lever rotating integrally with the rotating base.

6. The connector of claim 1, wherein:

the pressing protrusion is further configured to be displaceable in the second direction with respect to the housing, the contact pressure applying component is switchable to the first position and the second position by a displacement of the pressing protrusion in the second direction, the pressing protrusion is arranged at a position deviated from the pressing protrusion accommodation region in the second direction, the mating terminal faces the pair of terminals in the first direction when the contact pressure applying component is at the first position, and the pressing protrusion is arranged in the pressing protrusion accommodation region and contacts the pair of terminals in the first direction to press each of the pair of terminals toward the mating terminal when the contact pressure applying component is at the second position.

7. The connector of claim 1, further comprising a first lock portion for holding the contact pressure applying component at the first position and a second lock portion for holding the contact pressure applying component at the second position.

8. The connector of claim 1, wherein:

the housing includes an open tube portion open to expose the pressing protrusion accommodation region to outside in the second direction, the contact pressure applying component further includes an annular engaging portion to be engaged with the open tube portion of the housing in a circumferential direction, and the connector further comprises:

a first lock portion for holding the contact pressure applying component at the first position, the first lock portion being disposed on the annular engaging portion and extending in a radial direction of the engaging portion, and a second lock portion for holding the contact pressure applying component at the second position, the second lock portion being disposed separately from the first lock portion in the circumferential direction and extending in the radial direction of the annular engaging portion.

* * * * *